United States Patent
Tarimala et al.

(10) Patent No.: US 10,856,353 B2
(45) Date of Patent: Dec. 1, 2020

(54) RADIO LINK FAILURE BASED MEASUREMENT REPORTING IN NARROWBAND INTERNET OF THINGS

(71) Applicant: QUALCOMM Incorporated, San Diego, CA (US)

(72) Inventors: Raghuveer Ramakrishna Srinivas Tarimala, Hyderabad (IN); Liangchi Hsu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/297,047

(22) Filed: Mar. 8, 2019

(65) Prior Publication Data

US 2019/0327784 A1  Oct. 24, 2019

(30) Foreign Application Priority Data

Apr. 19, 2018  (IN) .............................. 201841014833

(51) Int. Cl.
*H04W 76/19* (2018.01)
*H04W 76/27* (2018.01)
(Continued)

(52) U.S. Cl.
CPC .......... *H04W 76/19* (2018.02); *H04B 17/309* (2015.01); *H04W 24/02* (2013.01);
(Continued)

(58) Field of Classification Search
None
See application file for complete search history.

(56) References Cited

U.S. PATENT DOCUMENTS 9,860,743 B2 *  1/2018  Liao ...................... H04W 24/10
2012/0276936 A1 * 11/2012  Ahn ...................... H04W 76/19
                                                                      455/501
(Continued)

OTHER PUBLICATIONS

Ericsson: "Mobility Enhancements NB-IoT", 3GPP Draft; R2-166568 Mobility Enhancements NB-IOT, 3RD Generation Partnership Project (3GPP), Mobile Competence Centre; 650, Route Des Lucioles; F-06921 Sophia-Antipolis Cedex; France, vol. Ran WG2, No. Kaohsiung, Taiwan; Oct. 10, 2016-Oct. 14, 2016, Oct. 9, 2016, XP051151070, 7 pages, Retrieved from the Internet: URL: http://www.3gpp.org/ftp/Meetings_3GPP_SYNC/RAN2/Docs/ [retrieved on Oct. 9, 2016] paragraph [0003].
(Continued)

*Primary Examiner* — Anh Vu H Ly
(74) *Attorney, Agent, or Firm* — Holland & hart LLP

(57) ABSTRACT

Methods, systems, and devices for wireless communications are described. A user equipment (UE) operating in a narrowband communications system with a base station may identify a radio link failure (RLF) and then initiate a radio resource control (RRC) connection reestablishment procedure to reconnect with the base station. As part of the connection reestablishment procedure, the UE may transmit a reestablishment complete message to the base station to indicate the connection reestablishment procedure is successful and include a measurement report related to downlink signals received from the base station in the reestablishment complete message. In some cases, the measurement report may include an indication of downlink signal strength and downlink signal quality. As such, the UE may transmit the measurement report in a single RRC message after identifying the RLF. Based on the measurement report, the base station may then perform network planning.

13 Claims, 15 Drawing Sheets

(51) Int. Cl.
*H04W 72/04* (2009.01)
*H04W 24/02* (2009.01)
*H04B 17/309* (2015.01)
*H04W 24/10* (2009.01)

(52) U.S. Cl.
CPC ....... *H04W 24/10* (2013.01); *H04W 72/0413* (2013.01); *H04W 76/27* (2018.02)

(56) References Cited

U.S. PATENT DOCUMENTS

| | | | | |
|---|---|---|---|---|
| 2013/0143573 | A1* | 6/2013 | Basu Mallick ... | H04W 36/0072 455/437 |
| 2013/0150023 | A1* | 6/2013 | Kim ................ | H04W 36/32 455/423 |
| 2013/0315075 | A1* | 11/2013 | Tamura ............ | H04W 76/19 370/242 |
| 2015/0049707 | A1* | 2/2015 | Vajapeyam ....... | H04W 76/15 370/329 |
| 2015/0092746 | A1* | 4/2015 | Jang ................ | H04W 36/0058 370/331 |
| 2017/0048898 | A1 | 2/2017 | Jung et al. | |
| 2017/0070924 | A1* | 3/2017 | Wu .................. | H04W 36/08 |
| 2017/0171788 | A1* | 6/2017 | Won ................ | H04W 24/10 |
| 2017/0202042 | A1* | 7/2017 | Gao ................. | H04W 76/14 |
| 2018/0049087 | A1* | 2/2018 | Lee ................. | H04W 36/08 |
| 2018/0049181 | A1* | 2/2018 | Wu .................. | H04W 72/048 |
| 2018/0176710 | A1* | 6/2018 | Jang ................ | H04W 36/32 |
| 2018/0352459 | A1* | 12/2018 | Ku .................. | H04W 36/0088 |
| 2019/0037635 | A1* | 1/2019 | Guo ................ | H04W 76/27 |
| 2019/0059031 | A1* | 2/2019 | Hahn ............... | H04W 36/08 |
| 2019/0082363 | A1* | 3/2019 | Park ................ | H04W 24/10 |
| 2019/0215756 | A1* | 7/2019 | Park ................ | H04W 52/06 |
| 2020/0100161 | A1* | 3/2020 | Awada ............. | H04W 36/18 |
| 2020/0145889 | A1* | 5/2020 | Yamada .......... | H04W 36/00837 |

OTHER PUBLICATIONS

Huawei et al: "Introduction of Serving Cell Idle Mode Measurements Reporting in 36.331", 3GPP Draft; R2-1805074 Serving Cell Measurement Reporting in 36.331, 3rd Generation Partnership Project (3GPP), Mobile Competence Centre; 650, Route De Lucioles; F-06921 Sophia-Antipolis Cedex; France, vol. Ran WG2, No. Sanya, P.R. China; Apr. 16, 2018-Apr. 20, 2018, Apr. 14, 2018, XP051428757, 14 pages, Retrieved from the Internet: URL: http://www.3gpp.org/ftp/Meetings%5F3GPP%5FSYNC/RAN2/Docs/ [retrieved on Apr. 14, 2018] paragraph [5.3.7.5] paragraph [6.7.2].
International Search Report and Written Opinion—PCT/US2019/021617—ISA/EPO—dated Jul. 16, 2019 (183058WO).

* cited by examiner

RADIO LINK FAILURE BASED MEASUREMENT REPORTING IN NARROWBAND INTERNET OF THINGS

CROSS REFERENCES

The present application for patent claims the benefit of India Provisional Patent Application No. 201841014833 by TARIMALA, et al., entitled "RADIO LINK FAILURE BASED MEASUREMENT REPORTING IN NARROWBAND INTERNET OF THINGS filed Apr. 19, 2018, assigned to the assignee hereof, and which is expressly incorporated by reference herein.

BACKGROUND

The following relates generally to wireless communications, and more specifically to radio link failure (RLF) based measurement reporting in narrowband internet of things (NB-IoT).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, a base station and a UE may utilize a portion of frequency wideband (e.g., a narrowband) when communicating to reduce the number of resources utilized and decrease the chances of interference. Additionally, the UE may perform measurements for cell selection and/or cell reselection in order to detect a downlink signal strength, quality, etc. for determining a base station (e.g., a cell) transmitting on the narrowband resources. In some cases, these measurements may enable a base station or network operator to perform network optimization. However, measurements from certain UEs may provide more valuable information than other UEs (e.g., cell edge UEs as opposed to UEs in good coverage). Efficient techniques for reporting and gathering the UE measurements are desired.

SUMMARY

The described techniques relate to improved methods, systems, devices, and apparatuses that support RLF based measurement reporting in NB-IoT. Generally, the described techniques provide for a UE operating in a narrowband communications system with a base station to identify an RLF and then initiate a radio resource control (RRC) connection reestablishment procedure to reconnect with the base station. If the UE determines the RRC connection reestablishment procedure is successful, it may transmit an RRC connection reestablishment complete message to the base station to indicate a successful completion of the RRC connection reestablishment procedure and include a measurement report related to downlink signals received from the base station. In some cases, the measurement report may include a narrowband reference signal received power (NRSRP) measurement and a narrowband reference signal received quality (NRSRQ) measurement, where the NRSRP measurement indicates a downlink signal strength and the NRSRQ measurement indicates a downlink signal quality. Accordingly, the UE may transmit the measurement report in a single RRC message after identifying the RLF. Based on the measurement report, the base station may perform network planning. In some cases, the network planning may include adjusting a downlink transmission power, one or more antennas, a downlink repetition number, or an additional parameter for network optimization.

A method of wireless communications at a UE operating in a narrowband communications system is described. The method may include identifying an RLF for communications with a base station in the narrowband communications system, initiating a RRC connection reestablishment procedure based on the identified RLF, determining the RRC connection reestablishment procedure is successful, and transmitting, to the base station, an RRC connection reestablishment complete message based on the successful RRC connection reestablishment procedure, the RRC connection reestablishment complete message including a measurement report related to downlink signals received from the base station.

An apparatus for wireless communications at a UE operating in a narrowband communications system is described. The apparatus may include a processor, memory in electronic communication with the processor, and instructions stored in the memory. The instructions may be executable by the processor to cause the apparatus to identify an RLF for communications with a base station in the narrowband communications system, initiate a RRC connection reestablishment procedure based on the identified RLF, determine the RRC connection reestablishment procedure is successful, and transmit, to the base station, an RRC connection reestablishment complete message based on the successful RRC connection reestablishment procedure, the RRC connection reestablishment complete message including a measurement report related to downlink signals received from the base station.

Another apparatus for wireless communications at a UE operating in a narrowband communications system is described. The apparatus may include means for identifying an RLF for communications with a base station in the narrowband communications system, initiating a RRC connection reestablishment procedure based on the identified RLF, determining the RRC connection reestablishment procedure is successful, and transmitting, to the base station, an RRC connection reestablishment complete message based on the successful RRC connection reestablishment procedure, the RRC connection reestablishment complete message including a measurement report related to downlink signals received from the base station.

A non-transitory computer-readable medium storing code for wireless communications at a UE operating in a narrowband communications system is described. The code may include instructions executable by a processor to identify an RLF for communications with a base station in the narrowband communications system, initiate a RRC connection reestablishment procedure based on the identified RLF, determine the RRC connection reestablishment procedure is successful, and transmit, to the base station, an RRC connection reestablishment complete message based on the successful RRC connection reestablishment procedure, the RRC connection reestablishment complete message including a measurement report related to downlink signals received from the base station.

Some examples of the method, apparatuses, and non-transitory computer-readable medium described herein may further include operations, features, means, or instructions for receiving, from the base station, downlink reference signals based on a cell selection or a cell reselection procedure, measuring a signal power and a signal quality associated with the downlink reference signals and transmitting, to the base station, the signal power and the signal quality in the measurement report in the RRC connection reestablishment complete message.

In some examples of the method, apparatuses, and non-transitory computer-readable medium described herein, the measured signal power may include an NRSRP measurement and the measured signal quality includes an NRSRQ measurement.

In some examples of the method, apparatuses, and non-transitory computer-readable medium described herein, the NRSRP measurement may indicate a downlink signal strength and the NRSRQ measurement indicates a downlink signal quality.

Some examples of the method, apparatuses, and non-transitory computer-readable medium described herein may further include operations, features, means, or instructions for transmitting the measurement report in a single RRC message.

In some examples of the method, apparatuses, and non-transitory computer-readable medium described herein, the RRC connection reestablishment complete message may be a message-5 (MSG5) of the RRC connection reestablishment procedure.

In some examples of the method, apparatuses, and non-transitory computer-readable medium described herein, the RLF may include a maximum number of random access channel (RACH) attempts failure, a maximum number of radio link control (RLC) packet data unit (PDU) retransmissions failure, or a physical layer link failure.

In some examples of the method, apparatuses, and non-transitory computer-readable medium described herein, the measurement report may include at least an NRSRP and an NRSRQ measurement.

In some examples of the method, apparatuses, and non-transitory computer-readable medium described herein, determining the RRC connection reestablishment procedure may be successful further may include operations, features, means, or instructions for transmitting, to the base station, an RRC connection reestablishment request message, where the RRC connection reestablishment request message includes a reestablishment cause based on the identified RLF and receiving, from the base station, an RRC connection reestablishment message based on the RRC connection reestablishment request message, where the RRC connection reestablishment message indicates resources configured for the RRC connection reestablishment procedure.

In some examples of the method, apparatuses, and non-transitory computer-readable medium described herein, the UE may be a cell edge NB-IoT UE associated with the base station.

A method of wireless communications at a base station operating in a narrowband communications system is described. The method may include receiving, from a UE, an RRC connection reestablishment complete message, where the RRC connection reestablishment complete message includes an indication of a successful RRC connection reestablishment for the UE, identifying a measurement report in the RRC connection reestablishment complete message, and performing network planning based on the measurement report received in the RRC connection reestablishment complete message.

An apparatus for wireless communications at a base station operating in a narrowband communications system is described. The apparatus may include a processor, memory in electronic communication with the processor, and instructions stored in the memory. The instructions may be executable by the processor to cause the apparatus to receive, from a UE, an RRC connection reestablishment complete message, where the RRC connection reestablishment complete message includes an indication of a successful RRC connection reestablishment for the UE, identify a measurement report in the RRC connection reestablishment complete message, and perform network planning based on the measurement report received in the RRC connection reestablishment complete message.

Another apparatus for wireless communications at a base station operating in a narrowband communications system is described. The apparatus may include means for receiving, from a UE, an RRC connection reestablishment complete message, where the RRC connection reestablishment complete message includes an indication of a successful RRC connection reestablishment for the UE, identifying a measurement report in the RRC connection reestablishment complete message, and performing network planning based on the measurement report received in the RRC connection reestablishment complete message.

A non-transitory computer-readable medium storing code for wireless communications at a base station operating in a narrowband communications system is described. The code may include instructions executable by a processor to receive, from a UE, an RRC connection reestablishment complete message, where the RRC connection reestablishment complete message includes an indication of a successful RRC connection reestablishment for the UE, identify a measurement report in the RRC connection reestablishment complete message, and perform network planning based on the measurement report received in the RRC connection reestablishment complete message.

Some examples of the method, apparatuses, and non-transitory computer-readable medium described herein may further include operations, features, means, or instructions for receiving one or more additional RRC connection reestablishment complete messages, determining that the received additional RRC connection reestablishment complete messages exceed a threshold value of RRC connection reestablishment complete messages and adjusting one or more parameters associated with a coverage for the base station based on determining that the received one or more RRC connection reestablishment complete messages exceed the threshold value.

In some examples of the method, apparatuses, and non-transitory computer-readable medium described herein, the one or more parameters may include a downlink transmission power, a downlink repetition number, or an additional parameter associated with the coverage for the base station.

In some examples of the method, apparatuses, and non-transitory computer-readable medium described herein, performing network planning further may include operations, features, means, or instructions for increasing a transmission power of a downlink signal and transmitting, to the UE, the downlink signal at the increased transmission power.

In some examples of the method, apparatuses, and non-transitory computer-readable medium described herein, the network planning may include network optimization.

In some examples of the method, apparatuses, and non-transitory computer-readable medium described herein, performing network planning further may include operations, features, means, or instructions for adjusting one or more antennas for transmission of a downlink signal and transmitting, to the UE, the downlink signal according to the adjusted antennas.

In some examples of the method, apparatuses, and non-transitory computer-readable medium described herein, adjusting the one or more antennas further may include operations, features, means, or instructions for adjusting an antenna azimuth, tilt, height, or a combination thereof.

In some examples of the method, apparatuses, and non-transitory computer-readable medium described herein, the measurement report may include at least an NRSRP and an NRSRQ measurement.

In some examples of the method, apparatuses, and non-transitory computer-readable medium described herein, the measurement report may be received in one RRC message.

DETAILED DESCRIPTION

Figure 1:
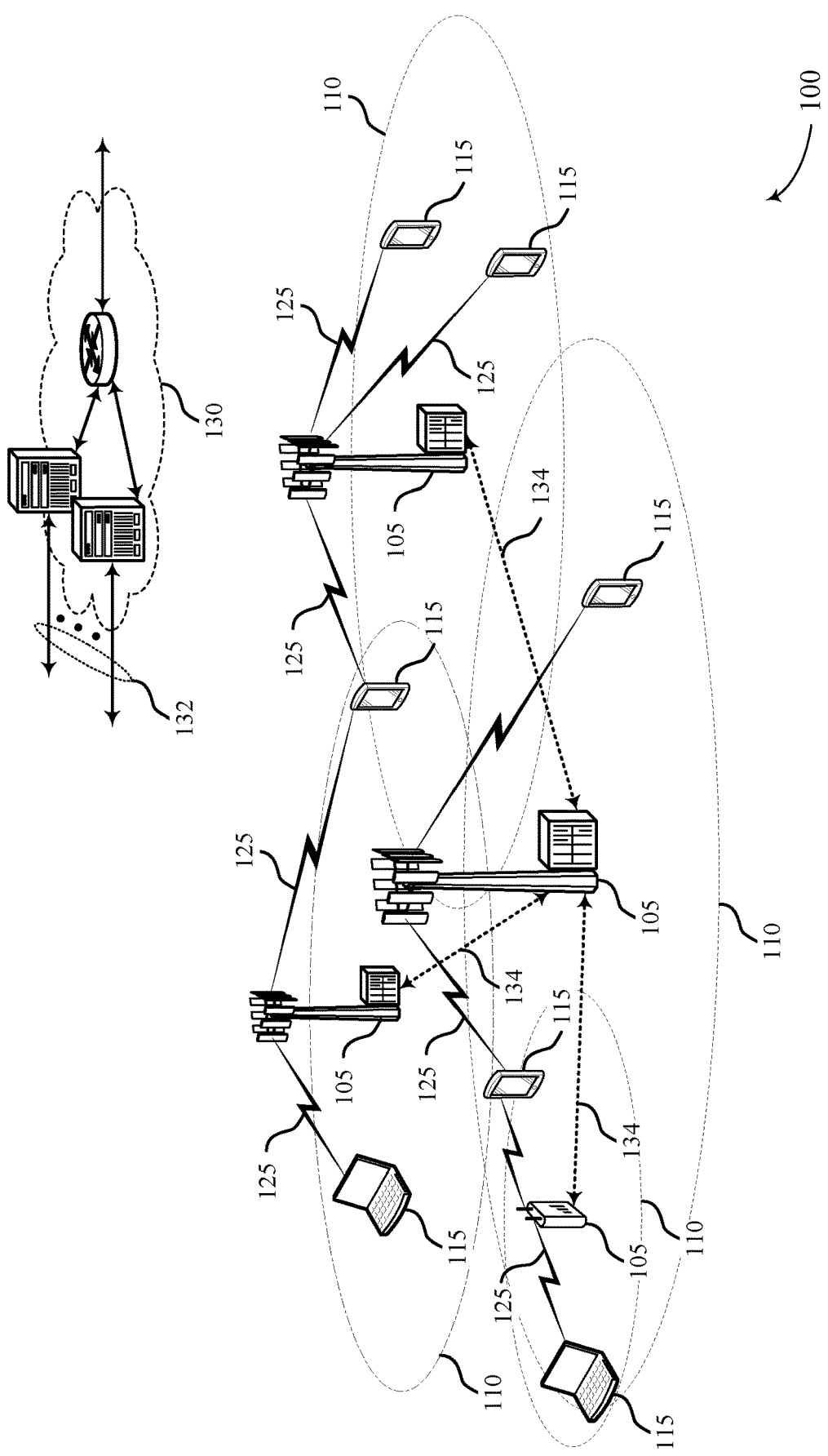
FIG. 1 illustrates an example of a wireless communications system that supports RLF based measurement reporting in NB-IoT in accordance with aspects of the present disclosure.

In some wireless communications (e.g., Internet of Things (IoT)), a UE may perform measurements on a downlink signal from a base station to determine a signal strength, a signal quality, or additional transmission characteristics of the downlink signal (e.g., reference signal received power (RSRP), reference signal received quality (RSRQ), reference signal signal-plus-interference-to-noise ratio (RS-SINR), etc.), which may enable the UE to determine or choose a base station for a cell selection and/or a cell reselection procedure. For example, the UE may start up (e.g., turn on, wake up from a sleep cycle, etc.), scan for downlink signals from nearby base stations, perform the measurements, and decide on a base station (e.g., cell) to camp on based on the measurements. Additionally, based on these measurements, the base station may perform different techniques to improve network planning and network optimization (e.g., boost transmission power, adjust antennas, etc.). However, in existing scenarios, the base station may request the UE to send these measurements in a request-response protocol, which may increase latency or lead to measurements from less valuable UEs. For example, measurements from UEs with a good connection to the base station may be less valuable than measurements from UEs on a cell edge of the base station because the measurements from the cell edge UEs may indicate deficiencies in the current coverage area. As such, as described in the present disclosure, the cell edge UEs may report these measurements, while UEs in good coverage may refrain from reporting their measurements.

In order to determine which UEs in a coverage area of the base station entail cell edge UEs for reporting the measurements, a UE which experiences a RLF but then successfully mitigates the RLF may report the measurements in a connection reestablishment complete message (e.g., a MSG5 of a connection reestablishment procedure) transmitted after the successful completion of the RLF. Accordingly, the cell edge UEs may report the measurements in a single message without adding additional information elements to separate broadcast messages (e.g., to indicate thresholds for reporting the measurements). As described above, the base station may then perform network planning based on the reported measurements. For example, if the base station receives a number of connection reestablishment complete messages with measurement reports from separate, corresponding cell edge UEs that exceed a threshold value, the base station may determine there are deficiencies in the existing coverage area and increase its downlink transmission power to prevent further RLFs and improve the coverage area.

Additionally, in some cases, the UE and base station may communicate on a portion of resources of a frequency wideband. This portion of resources may be referred to as a narrowband and may enable the UE and base station to utilize fewer resources for communications, consume less power, expand a coverage range, resist interferences, etc. Accordingly, the measurements performed by the UE may correspond to the narrowband communications (e.g., NRSRP, NRSRQ, narrowband RS-SINR (NRS-SINR), etc.), and the base station may perform the network planning based on the narrowband measurements. Additionally or alternatively, the measurements may correspond to the frequency wideband, and the UE and base station may perform the techniques as described herein based on the wideband measurements.

Aspects of the disclosure are initially described in the context of a wireless communications system. Additional wireless communications systems and a process flow are then provided to describe aspects of the present disclosure. Aspects of the disclosure are further illustrated by and described with reference to apparatus diagrams, diagrams, and flowcharts that relate to RLF based measurement reporting in NB-IoT.

FIG. 1 illustrates an example of a wireless communications system 100 that supports RLF based measurement reporting in NB-IoT in accordance with aspects of the present disclosure. The wireless communications system 100 includes base stations 105, UEs 115, and a core network 130. In some examples, the wireless communications system 100 may be an LTE network, an LTE-A network, an LTE-A Pro network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), NB-IoT, enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an IoT device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. An RLC layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink component carriers (CCs) and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

As described above, a UE 115 may be configured for operation using a narrowband protocol type that is associated with a predefined portion or range (e.g., set of subcarriers or resource blocks (RBs)) within a carrier (e.g., "in-band" deployment of a narrowband protocol type) to communicate with a base station 105. The narrowband protocol may enable the UE 115 and base station 105 to utilize fewer resources of a wideband for communications, consume less power, expand a coverage range of the base station 105, resist interferences, etc. For example, the predefined portion may include 62 subcarriers (e.g., six (6) RBs) within the wideband. In some cases, the UE 115 may further be an IoT device (e.g., sensor, meter, appliance, etc.), where the UE 115 is stationary and battery powered. As such, utilizing the narrowband may enable more efficient communications by, for example, extending the battery life from consuming less power and by reaching farther distances from the base station 105 to include the stationary UE 115 from expanding the coverage area.

When selecting and/or reselecting a base station 105, an NB-IoT UE 115 may scan for downlink reference signals from nearby base stations 105. The NB-IoT UE 115 may perform measurements on these downlink reference signals to determine a signal power, a signal quality, or additional metric of the downlink reference signal from each base station 105. For example, the NB-IoT UE 115 may measure an NRSRP, an NRSRQ, an NRS-SINR, or a combination thereof for downlink reference signals from each nearby base station 105. Based on these measurements, the NB-IoT UE 115 may decide which base station 105 to camp on for reporting relevant data. In some cases, the base station 105 which the NB-IoT UE 115 is camping on may request the measurements for itself from the NB-IoT UE 115, and the NB-IoT UE 115, consequently, may report the measurements. The base station 105 may then utilize these measurements to enable network planning and optimization. For example, based on the measurements, the base station 105 may identify portions of its coverage area not receiving a strong enough signal based on the measurements from one or more UEs 115 (e.g., including the NB-IoT UE 115) and may perform techniques to mitigate the issues (e.g., boost power, adjust antennas, etc.).

In some cases, measurements from certain UEs 115 in the coverage area of the base station 105 may provide more valuable information than other UEs 115 for the base station 105 to perform network planning. For example, UEs 115 at the edge of the coverage area (e.g., cell edge UEs 115) may experience signaling with a lower quality from the base station 105 than UEs 115 in good coverage, which may enable the base station 105 to determine portions of the coverage area that could benefit to a greater extent from the network planning. As such, UEs 115 that experience the lower quality signaling may report their measurements to the base station 105, while UEs 115 in good coverage may refrain from reporting their measurements. In some cases, the UEs 115 may determine to report their measurements based on if the measurements fall below a threshold. If the measurements do fall below the threshold, then the UE 115 may report the measurements in one or more messages (e.g., RRC messages) to the base station 105. However, basing the determination on the threshold value and reporting the measurements in multiple messages may add additional information elements to existing signal broadcasting (e.g., system information blocks (SIBs)) and increase signaling overhead and/or power consumption at the UEs 115.

Wireless communications system 100 may support efficient techniques for determining which UEs 115 may report downlink reference signal measurements and for transmitting the corresponding measurements to a base station 105. When a UE 115 experiences an RLF with a base station 105, it may perform an RRC connection reestablishment procedure to reconnect with the base station 105. If the RRC connection reestablishment is determined to be successful, the UE 115 may transmit an RRC connection reestablishment complete message (e.g., a MSG5 of the RRC connection reestablishment procedure) to the base station 105 to indicate the successful completion of the RRC connection reestablishment procedure. In the RRC connection reestablishment complete message, the UE 115 may additionally report the downlink reference signal measurements. As such, the UE 115 may report the downlink reference signal measurements in a single message (e.g., single RRC message) without adding additional information elements to separate broadcast signaling. Additionally, UEs 115 in cell edge conditions that experience RLF may report their downlink reference signal measurements, while UEs 115 in good coverage and do not experience RLF may refrain from reporting their downlink reference signal measurements. Accordingly, the base station 105 may then perform network planning based on the reported downlink reference signal measurements.

Figure 2:
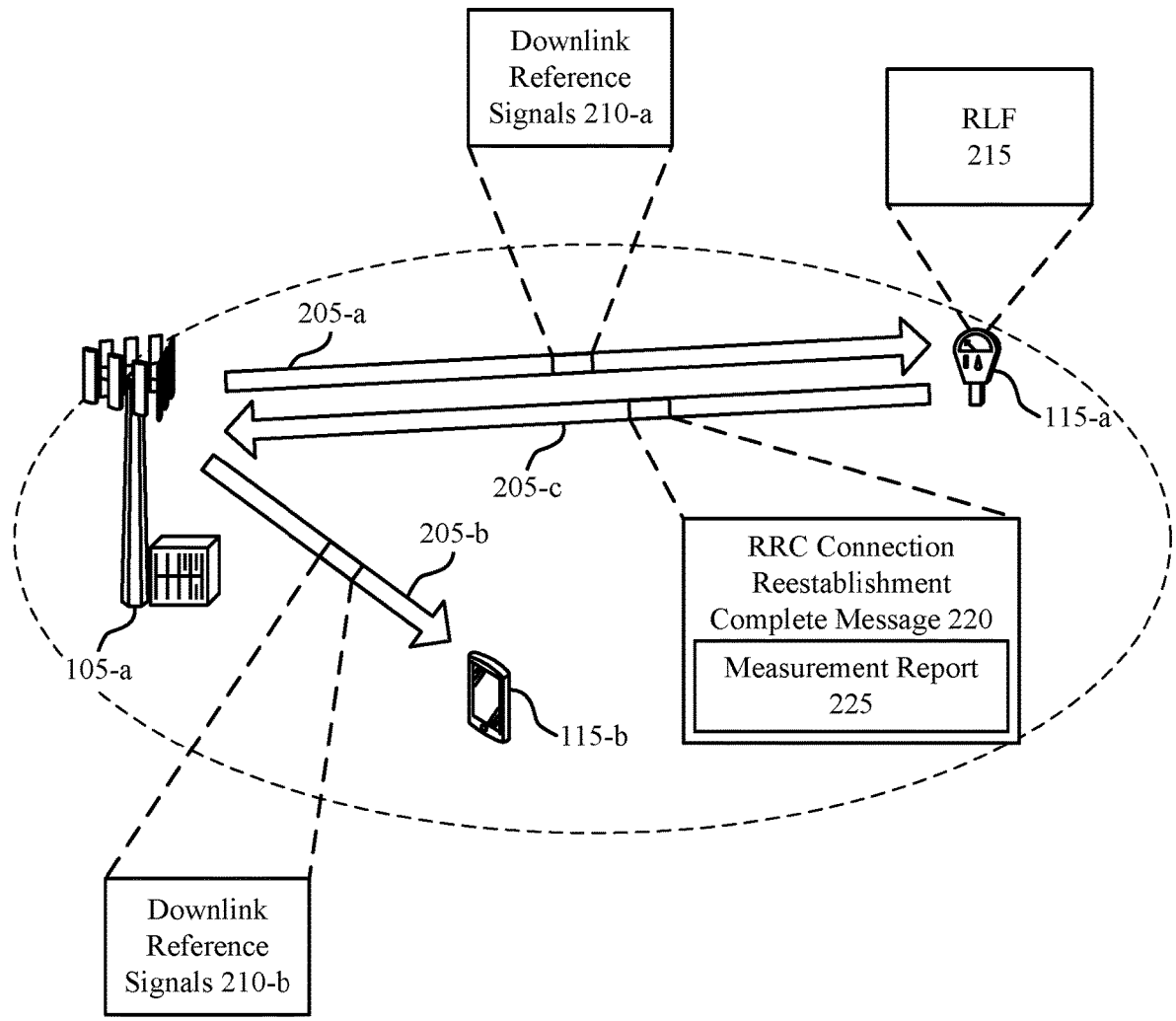
FIGS. 2 and 3 illustrate additional examples of wireless communications systems that support RLF based measurement reporting in NB-IoT in accordance with aspects of the present disclosure.

FIG. 2 illustrates an example of a wireless communications system 200 that supports RLF based measurement reporting in NB-IoT in accordance with aspects of the present disclosure. In some examples, wireless communications system 200 may implement aspects of wireless communications system 100. Wireless communications system 200 may include a base station 105-a, a UE 115-a, and a UE 115-b, which may be examples of corresponding base stations 105 and UEs 115 as described above with reference to FIG. 1. As described herein, base station 105-a may communicate with UE 115-a and UE 115-b on narrowband resources. Additionally, UE 115-a and UE 115-b may be IoT devices operating on the narrowband (e.g., NB-IoT UEs 115). As shown and described above with reference to UEs 115, UE 115-a may be a meter or sensor that is stationary near the edge of a coverage area 110-a for base station 105-a. Additionally or alternatively, UE 115-b may be a mobile device moving through coverage area 110-a. Although not shown, it is to be understood that UE 115-a and UE 115-b may be any form of UE 115 (e.g., stationary, mobile, meter, mobile device, etc.).

Base station 105-a may transmit downlink reference signals 210 that UEs 115 within coverage area 110-a may utilize to identify and connect to base station 105-a, where downlink reference signals 210 are cell-specific (e.g., specific to base station 105-a or a specific cell within base station 105-a). In some cases, downlink reference signals 210 may be broadcasted by base station 105-a. Alternatively, base station 105-a may transmit downlink reference signals 210 to each UE 115 specifically (e.g., unicasted, multicasted, etc.). In either case, each UE 115 may receive downlink reference signals 210 on resources of a carrier 205. For example, UE 115-a may receive downlink reference signals 210-a on resources of carrier 205-a, and UE 115-b may receive downlink reference signals 210-b on resources of carrier 205-b. In some cases, downlink reference signals 210-a and 210-b may be the same, and the resources of each carrier 205 that they are received upon may be the same.

Subsequently, each UE 115 may perform measurements on downlink reference signals 210 for cell selection and/or cell reselection procedures. For example, each UE 115 may measure a signal power and signal quality of downlink reference signals 210. In some cases, the signal power and signal quality measurements may include NRSRP, NRSRQ, and NRS-SINR measurements for narrowband communications. NRSRP may indicate an average power of resource elements that carry downlink reference signals 210 over the corresponding bandwidth (e.g., narrowband) and, accordingly, may indicate the average received power of a single resource element. NRSRQ may indicate a relationship between the NRSRP and power from additional cells, adjacent channel interference, thermal noise, etc. (e.g., narrowband received signal strength indicator (NRSSI)) and, as such, may indicate the quality of the received downlink reference signals 210. NRS-SINR may indicate a SINR for downlink reference signals 210, which may additionally indicate the quality of received downlink reference signals 210.

Based on the measurements of downlink reference signals 210, each UE 115 may determine if it will camp on or connect to base station 105-*a* for subsequent communications. As such, each UE 115 camping on base station 105-*a* may transmit uplink data aperiodically, periodically, or semi-persistently based on the type of uplink data (e.g., low latency data) and/or an arranged transmission schedule (e.g., a discontinuous transmission (DTX) cycle). However, in some cases, a UE 115 may experience an RLF 215 due to poor channel conditions that disrupts communications with base station 105-*a*. For example, UE 115-*a* may experience RLF 215 based on a maximum number of random access channel (RACH) attempts failure, a maximum number of RLC PDU retransmissions failure, a physical layer link problem, etc. Consequently, UE 115-*a* may perform an RRC connection reestablishment procedure to reconnect to base station 105-*a*.

The RRC connection reestablishment procedure may include ramping up power at UE 115-*a* and attempting an additional RACH procedure to reconnect to base station 105-*a*. For example, UE 115-*a* may transmit an RRC connection reestablishment request message (e.g., RRCConnectionReestablishmentRequest-NB message or message-3 (MSG3) of the RRC connection reestablishment procedure) at a higher power to base station 105-*a* that includes a reestablishment cause (e.g., RLF 215) and identity of UE 115-*a*. Base station 105-*a* may then transmit an RRC connection reestablishment message (e.g., RRCConnectionReestablishment-NB message or message-4 (MSG4) of the RRC connection reestablishment procedure) that indicates a configuration of resources for the RRC connection reestablishment procedure and for UE 115-*a* to utilize for reconnecting to base station 105-*a*. If UE 115-*a* receives the RRC connection reestablishment message and is able to reconnect to base station 105-*a*, it may transmit an RRC connection reestablishment complete message 220 (e.g., RRCConnectionReestablishmentComplete-NB message or MSG5 of the RRC connection reestablishment procedure) to base station 105-*a* on resources of carrier 205-*c* to indicate a successful completion of the RRC connection reestablishment procedure.

As described herein, when transmitting RRC connection reestablishment complete message 220, UE 115-*a* may additionally transmit the downlink reference signal measurements in a measurement report 225. As such, UE 115-*a* may transmit measurement report 225 in a single RRC message (e.g., RRC connection reestablishment complete message 220) and without adding additional information elements to existing SIB messages (e.g., to indicate a threshold value to determine when to transmit measurement report 225). Alternatively, UE 115-*b* may be in good coverage of base station 105-*a* and, accordingly, may not experience an RLF. Consequently, UE 115-*b* may not transmit a measurement report for its downlink reference signal measurements.

Through the techniques described above, cell edge UEs 115 (e.g., UE 115-*a*) may transmit measurement report 225 after a successful RRC connection reestablishment procedure following an RLF, and UEs 115 that do not experience RLF (e.g., UE 115-*b*) or UEs 115 that experience RLF but do not successfully reconnect after an RRC connection reestablishment procedure may not transmit a measurement report. Accordingly, base station 105-*a* may then determine to perform network planning and optimization based on received measurement reports in order to provide better signaling to the cell edge UEs 115 while not lowering the quality of signaling to the other UEs 115 in coverage area 110-*a*. For example, base station 105-*a* may boost a transmission power of downlink reference signals 210, adjust one or more antennas for transmitting downlink reference signals 210, or perform a similar mitigation technique to enhance the signal reception at the UEs 115 across coverage area 110-*a*.

Although wireless communications system 200 illustrates techniques performed in a narrowband scenario, the techniques may further be performed in wideband communications. For example, the UEs 115 may measure an RSRP, an RSRQ, and/or RS-SINR on downlink reference signals from a base station 105 for a corresponding wideband bandwidth. If a UE 115 experiences an RLF and successfully completes an RRC connection reestablishment procedure, it may transmit these downlink reference signal measurements in an RRC connection reestablishment complete message (e.g., RRCConnectionReestablishmentComplete message or MSG5 of the RRC connection reestablishment procedure). Alternatively, a UE 115 that does not experience an RLF and/or does not successfully complete the RRC connection reestablishment procedure may not transmit its downlink reference signal measurements to the base station 105.

Figure 3:
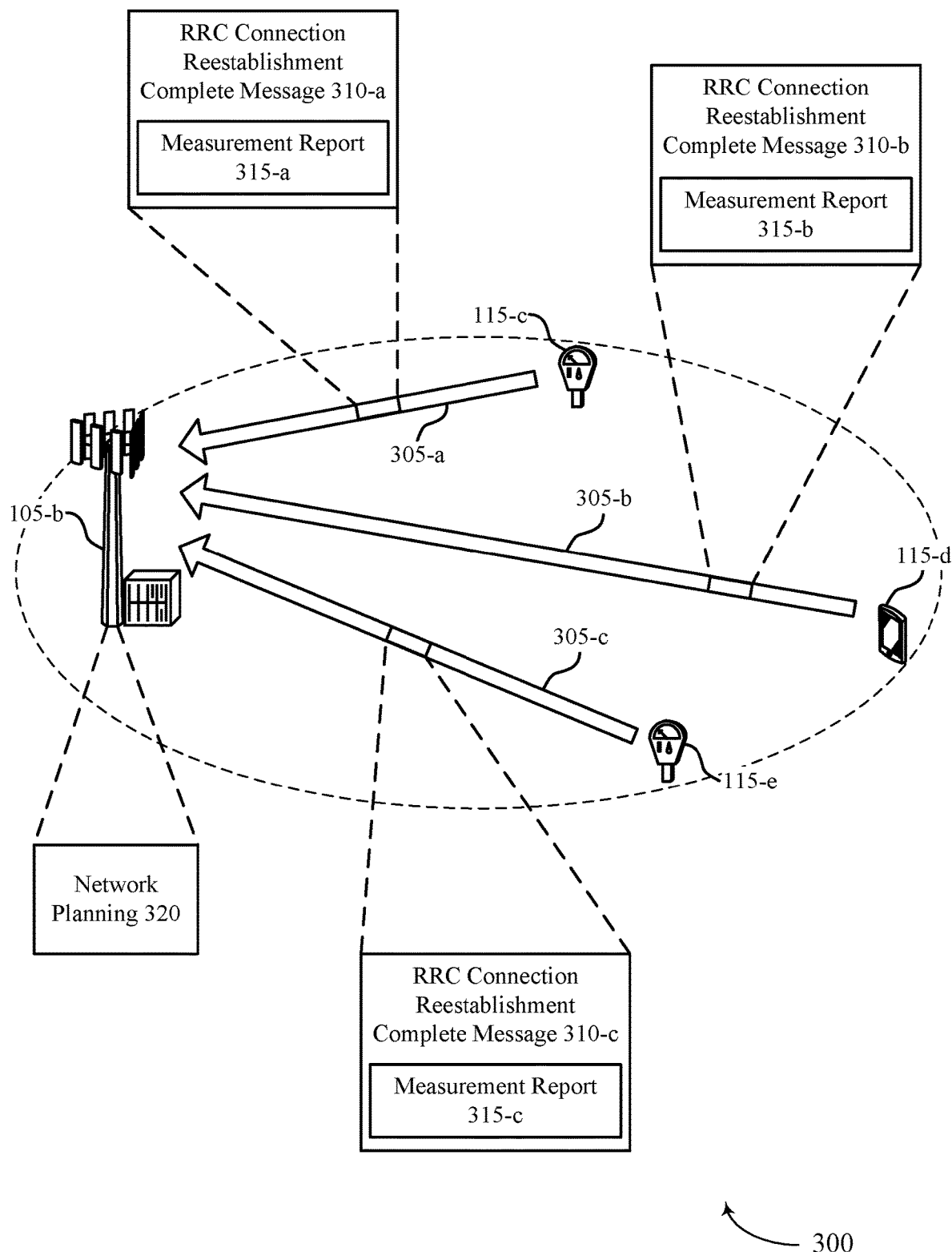

FIG. 3 illustrates an example of a wireless communications system 300 that supports RLF based measurement reporting in NB-IoT in accordance with aspects of the present disclosure. In some examples, wireless communications system 300 may implement aspects of wireless communications systems 100 and/or 200. Wireless communications system 300 may include a base station 105-*b*, a UE 115-*c*, a UE 115-*d*, and a UE 115-*e*, which may be examples of corresponding base stations 105 and UEs 115 as described above with reference to FIGS. 1-2. As described herein, base station 105-*b* may communicate with UE 115-*c*, UE 115-*d*, and UE 115-*e* on narrowband resources. Additionally, UE 115-*c*, UE 115-*d*, and UE 115-*e* may be IoT devices operating on the narrowband (e.g., NB-IoT UEs 115). While each UE 115 is shown as a different type of UE 115 (e.g., UEs 115-*c* and 115-*e* are meters/sensors/appliances and UE 115-*d* is a mobile device), it is to be understood that each UE 115 may be any type of UE 115 (e.g., stationary, mobile, meter, mobile device, etc.).

As described herein, each UE 115 may have previously experienced an RLF and started an RRC connection reestablishment procedure. Upon successful completion of the RRC connection reestablishment procedure, each UE 115 may transmit an RRC connection reestablishment complete message 310 to base station 105 that includes a measurement report 315 for measurements of downlink reference signals from base station 105-*b* (e.g., NRSRP, NRSRQ, NRS-SINR, etc.). For example, UE 115-*c* may transmit RRC connection reestablishment complete message 310-*a* with measurement report 315-*a* on a carrier 305-*a*, UE 115-*d* may transmit RRC connection reestablishment complete message 310-*b* with measurement report 315-*b* on a carrier 305-*b*, and UE 115-*e* may transmit RRC connection reestablishment complete message 310-*c* with measurement report 315-*c* on a carrier 305-*c*. Additionally or alternatively, each UE 115 may utilize a same set of resources on a carrier 305 for transmitting a respective RRC connection reestablishment complete message 310 with a measurement report 315.

Based on measurement reports 315, base station 105-*b* may perform network planning 320. In some cases, base station 105-*b* may determine to perform network planning 320 based on the number of measurement reports 315 and, hence, the number of successful connection reestablishment procedures after RLFs. For example, if the number of measurement reports 315 and/or RRC connection reestablishment complete messages 310 exceeds a threshold value, base station 105-*b* may determine to then perform network planning 320. In the example of wireless communications system 300, the three RRC connection reestablishment complete messages 310 and corresponding measurement reports 315 may exceed a threshold value for base station 105-*b* and cause base station 105-*b* to perform network planning 320.

Accordingly, base station 105-*b* may perform one or more techniques as part of network planning 320. For example, base station 105-*b* may boost the transmission power of downlink signals in order to provide stronger signaling for the UEs 115 and prevent subsequent RLFs. Additionally or alternatively, base station 105-*b* may adjust one or more antennas (e.g., adjust an antenna azimuth, tilt, height, etc.) to better direct signaling towards the UEs 115 that experienced the RLF to prevent the subsequent RLFs. The above described techniques and additional techniques may provide network optimization for base station 105-*b* and the UEs 115. In some cases, base station 105-*a* may further adjust one or more coverage parameters to reduce the likelihood of the subsequent RLFs, where the parameters may include a downlink transmission power, a downlink repetition number, etc.

Although wireless communications system 300 illustrates techniques performed in a narrowband scenario, the techniques may further be performed in wideband communications.

Figure 4:
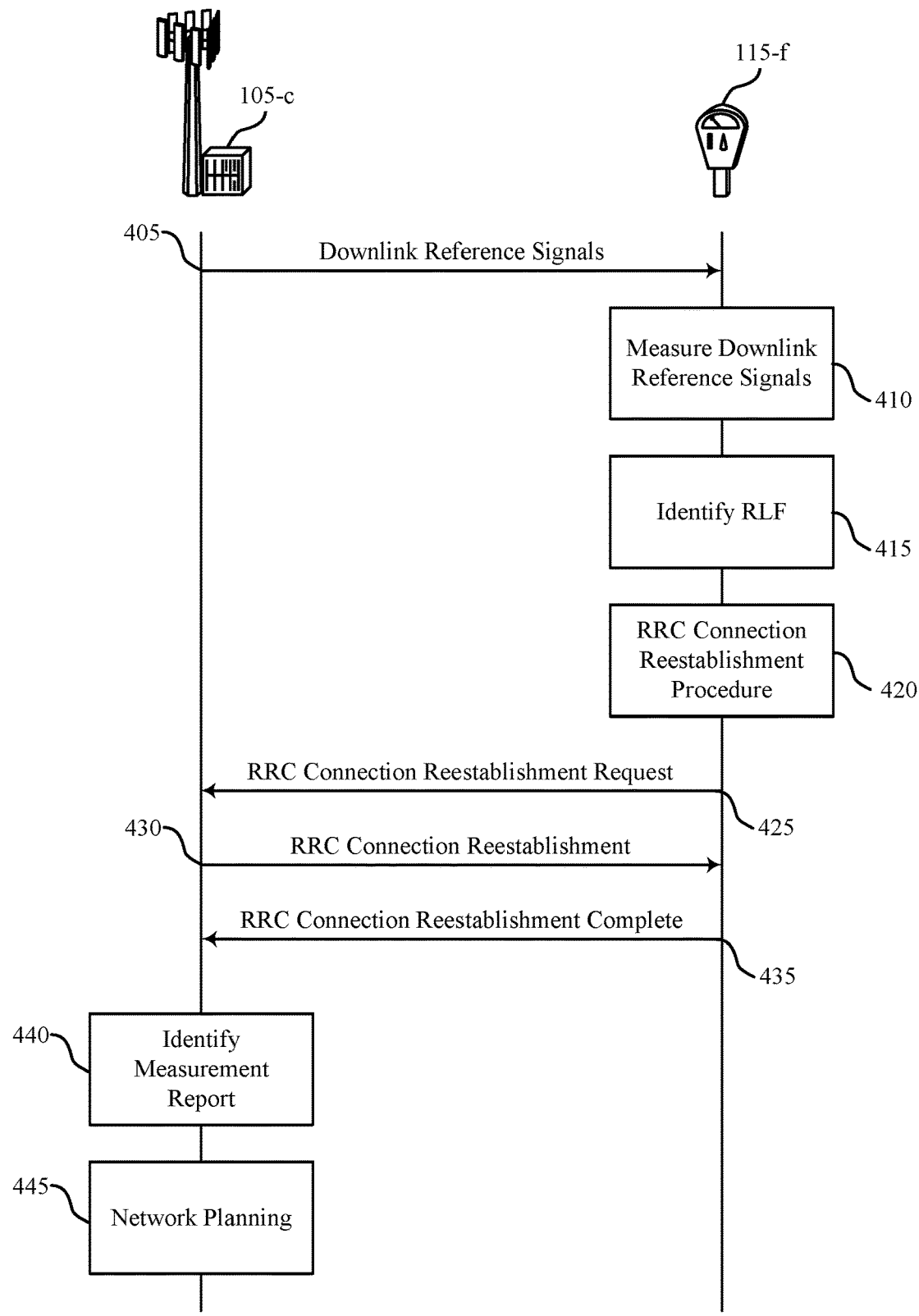
FIG. 4 illustrates an example of a process flow that supports RLF based measurement reporting in NB-IoT in accordance with aspects of the present disclosure.

FIG. 4 illustrates an example of a process flow 400 that supports RLF based measurement reporting in NB-IoT in accordance with aspects of the present disclosure. In some examples, process flow 400 may implement aspects of wireless communications systems 100, 200, and/or 300. Process flow 400 may include a base station 105-*c* and a UE 115-*f*, which may be examples of corresponding base stations 105 and UEs 115 as described above with reference to FIGS. 1-3. As described herein, base station 105-*c* may communicate with UE 115-*f* on narrowband resources. Additionally, UE 115-*f* may be an IoT device operating on the narrowband (e.g., NB-IoT UE 115). While UE 115-*f* is shown as a stationary meter/sensor/appliance, it is to be understood that UE 115-*f* may be any type of UE 115 (e.g., stationary, mobile, meter, mobile device, etc.).

In the following description of the process flow 400, the operations between UE 115-*f* and base station 105-*c* may be performed in different orders or at different times. Certain operations may also be left out of the process flow 400, or other operations may be added to the process flow 400. It is to be understood that while UE 115-*f* and base station 105-*c* are shown performing a number of the operations of process flow 400, any wireless device may perform the operations shown.

At 405, UE 115-*f* may receive, from base station 105-*c*, downlink reference signals based on a cell selection or a cell reselection procedure.

At 410, UE 115-*f* may measure a signal power and a signal quality associated with the downlink reference signals. In some cases, the measured signal power may include an NRSRP measurement, and the measured signal quality may include an NRSRQ measurement, where the NRSRP measurement indicates a downlink signal strength and the NRSRQ measurement indicates a downlink signal quality for the downlink reference signals.

At 415, UE 115-*f* may identify an RLF for communications with base station 105-*c* in the narrowband communications system. In some cases, the RLF may include a maximum number of RACH attempts failure, a maximum number of RLC PDU retransmissions failure, or a physical layer link failure. Additionally, UE 115-*f* may be a cell edge NB-IoT UE 115 associated with base station 105-*c*. As such, UE 115-*f* may experience the RLF due to poor channel conditions at the cell edge of base station 105-*c*.

At 420, UE 115-*f* may initiate an RRC connection reestablishment procedure based on the identified RLF. Accordingly, at 425, UE 115-*f* may transmit, to base station 105-*c*, an RRC connection reestablishment request message, where the RRC connection reestablishment request message includes a reestablishment cause based on the identified RLF.

At 430, UE 115-*f* may then receive, from base station 105-*c*, an RRC connection reestablishment message based on the RRC connection reestablishment request message, where the RRC connection reestablishment message indicates resources configured for the RRC connection reestablishment procedure. After receiving the RRC connection reestablishment message, UE 115-*f* may then determine if the RRC connection reestablishment procedure is successful.

At 435, UE 115-*f* may, accordingly, transmit, to base station 105-*c*, an RRC connection reestablishment complete message to indicate a successful RRC connection reestablishment procedure, the RRC connection reestablishment complete message including a measurement report related to the downlink signals received from base station 105-*c*. As such, UE 115-*f* may transmit the measurement report in a single RRC message. In some cases, the RRC connection reestablishment complete message may be a MSG5 of the RRC connection reestablishment procedure. Additionally, the measurement report may include the signal power and the signal quality measurements of the downlink reference signals (e.g., NRSRP and NRSRQ).

At 440, base station 105-*c* may identify the measurement report in the RRC connection reestablishment complete message.

At 445, base station 105-*c* may then perform network planning based on the measurement report received in the RRC connection reestablishment complete message. In some cases, base station 105-*c* may increase a transmission power of a downlink signal and transmit, to UE 115-*f*, the downlink signal at the increased transmission power. Additionally or alternatively, base station 105-*c* may adjust one or more antennas for transmission of a downlink signal and transmit, to UE 115-*f*, the downlink signal according to the adjusted antennas. Accordingly, the network planning may include network optimization.

In some cases, base station 105-c may receive one or more additional RRC connection reestablishment complete messages. In some cases, base station 105-c may then determine that the received additional RRC connection reestablishment complete messages exceed a threshold value of RRC connection reestablishment complete messages. Accordingly, base station 105-c may adjust one or more parameters associated with a coverage for itself based on determining that the received one or more RRC connection reestablishment complete messages exceed the threshold value. In some cases, the one or more parameters may include a downlink transmission power, a downlink repetition number, or an additional parameter associated with the coverage for the base station.

Although process flow 400 illustrates techniques as described herein as performed in a narrowband scenario, the techniques may further be performed in wideband communications.

Figure 5:
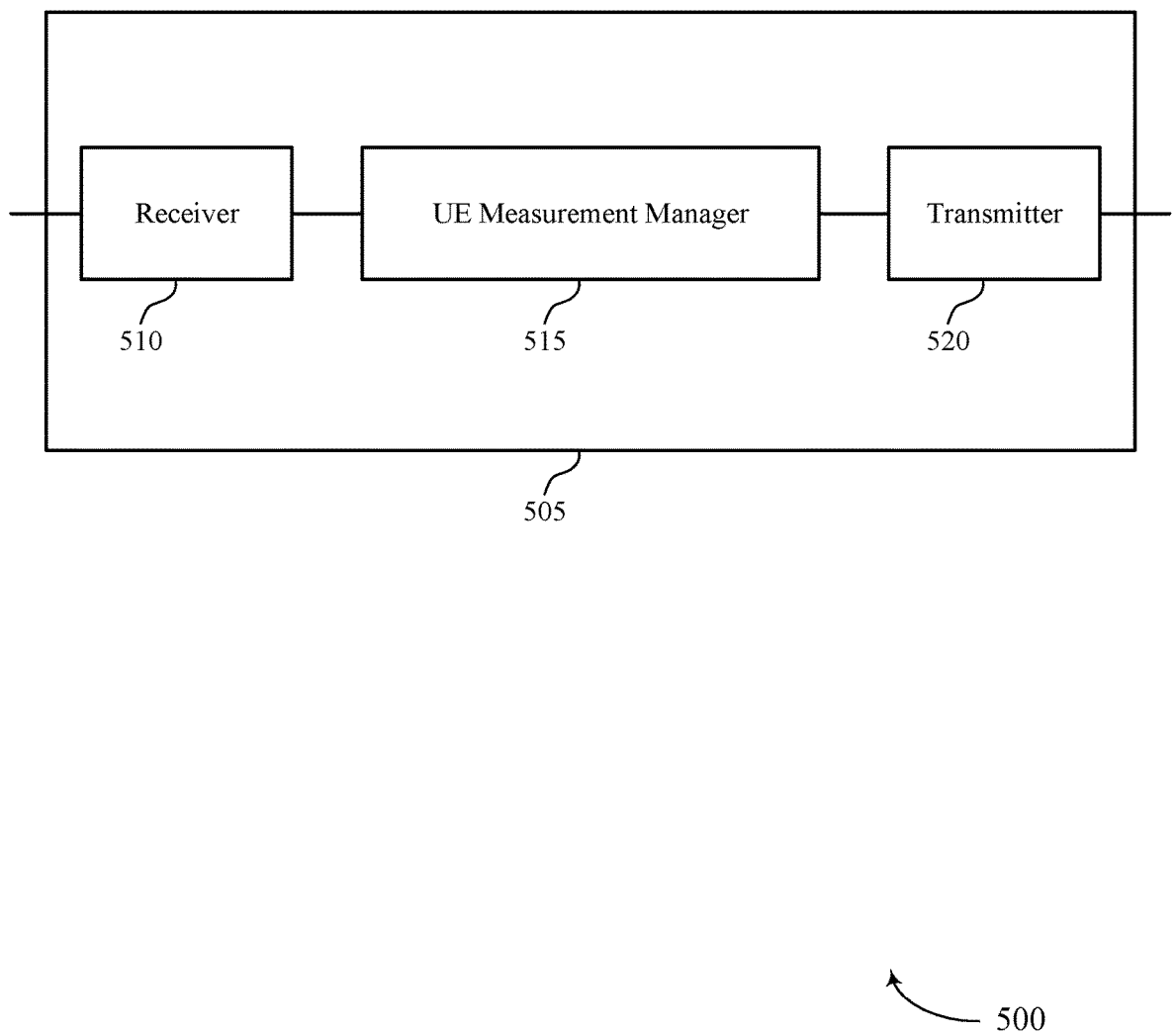
FIGS. 5 and 6 show diagrams of devices that support RLF based measurement reporting in NB-IoT in accordance with aspects of the present disclosure.

FIG. 5 shows a diagram 500 of a device 505 that supports RLF based measurement reporting in NB-IoT in accordance with aspects of the present disclosure. The device 505 may be an example of aspects of a UE 115 as described herein. The device 505 may include a receiver 510, a UE measurement manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to RLF based measurement reporting in NB-IoT, etc.). Information may be passed on to other components of the device 505. The receiver 510 may be an example of aspects of the transceiver 820 described with reference to FIG. 8. The receiver 510 may utilize a single antenna or a set of antennas.

The UE measurement manager 515 may identify an RLF for communications with a base station in the narrowband communications system. Accordingly, the UE measurement manager 515 may initiate an RRC connection reestablishment procedure based on the identified RLF. The UE measurement manager 515 may then determine the RRC connection reestablishment procedure is successful. As such, the UE measurement manager 515 may transmit, to the base station, an RRC connection reestablishment complete message based on the successful RRC connection reestablishment procedure, the RRC connection reestablishment complete message including a measurement report related to downlink signals received from the base station. The UE measurement manager 515 may be an example of aspects of the UE measurement manager 810 described herein.

The UE measurement manager 515, or its sub-components, may be implemented in hardware, code (e.g., software or firmware) executed by a processor, or any combination thereof. If implemented in code executed by a processor, the functions of the UE measurement manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE measurement manager 515, or its sub-components, may be physically located at various positions, including being distributed such that portions of functions are implemented at different physical locations by one or more physical components. In some examples, the UE measurement manager 515, or its sub-components, may be a separate and distinct component in accordance with various aspects of the present disclosure. In some examples, the UE measurement manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
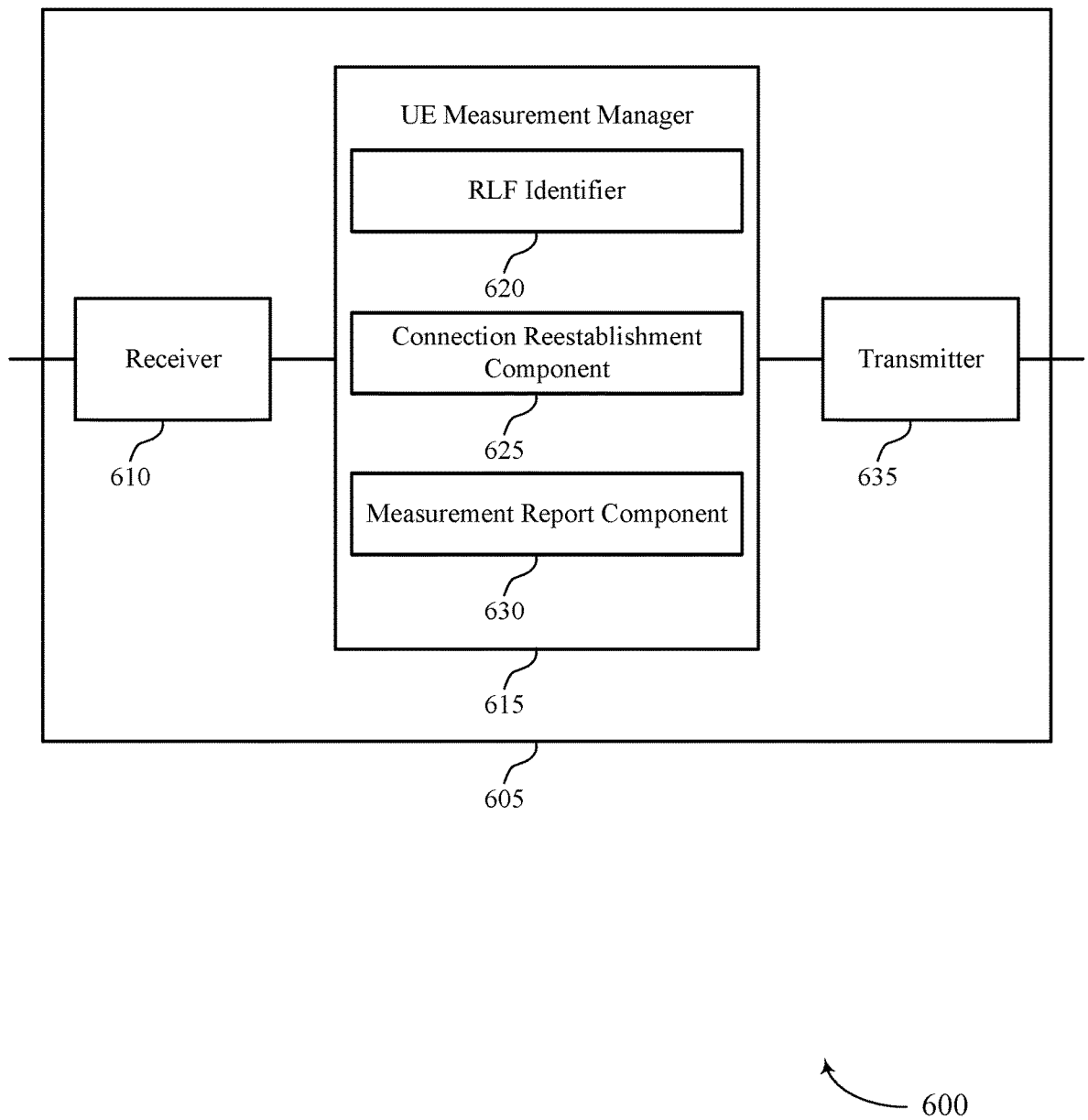

FIG. 6 shows a diagram 600 of a device 605 that supports RLF based measurement reporting in NB-IoT in accordance with aspects of the present disclosure. The device 605 may be an example of aspects of a device 505 or a UE 115 as described herein. The device 605 may include a receiver 610, a UE measurement manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to RLF based measurement reporting in NB-IoT, etc.). Information may be passed on to other components of the device 605. The receiver 610 may be an example of aspects of the transceiver 820 described with reference to FIG. 8. The receiver 610 may utilize a single antenna or a set of antennas.

The UE measurement manager 615 may be an example of aspects of the UE measurement manager 515 as described herein. The UE measurement manager 615 may include an RLF identifier 620, a connection reestablishment component 625, and a measurement report component 630. The UE measurement manager 615 may be an example of aspects of the UE measurement manager 810 described herein.

The RLF identifier 620 may identify an RLF for communications with a base station in the narrowband communications system.

The connection reestablishment component 625 may initiate an RRC connection reestablishment procedure based on the identified RLF. Additionally, in some examples, the connection reestablishment component 625 may determine the RRC connection reestablishment procedure is successful.

The measurement report component 630 may transmit, to the base station, an RRC connection reestablishment complete message based on the successful RRC connection reestablishment procedure, the RRC connection reestablishment complete message including a measurement report related to downlink signals received from the base station.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
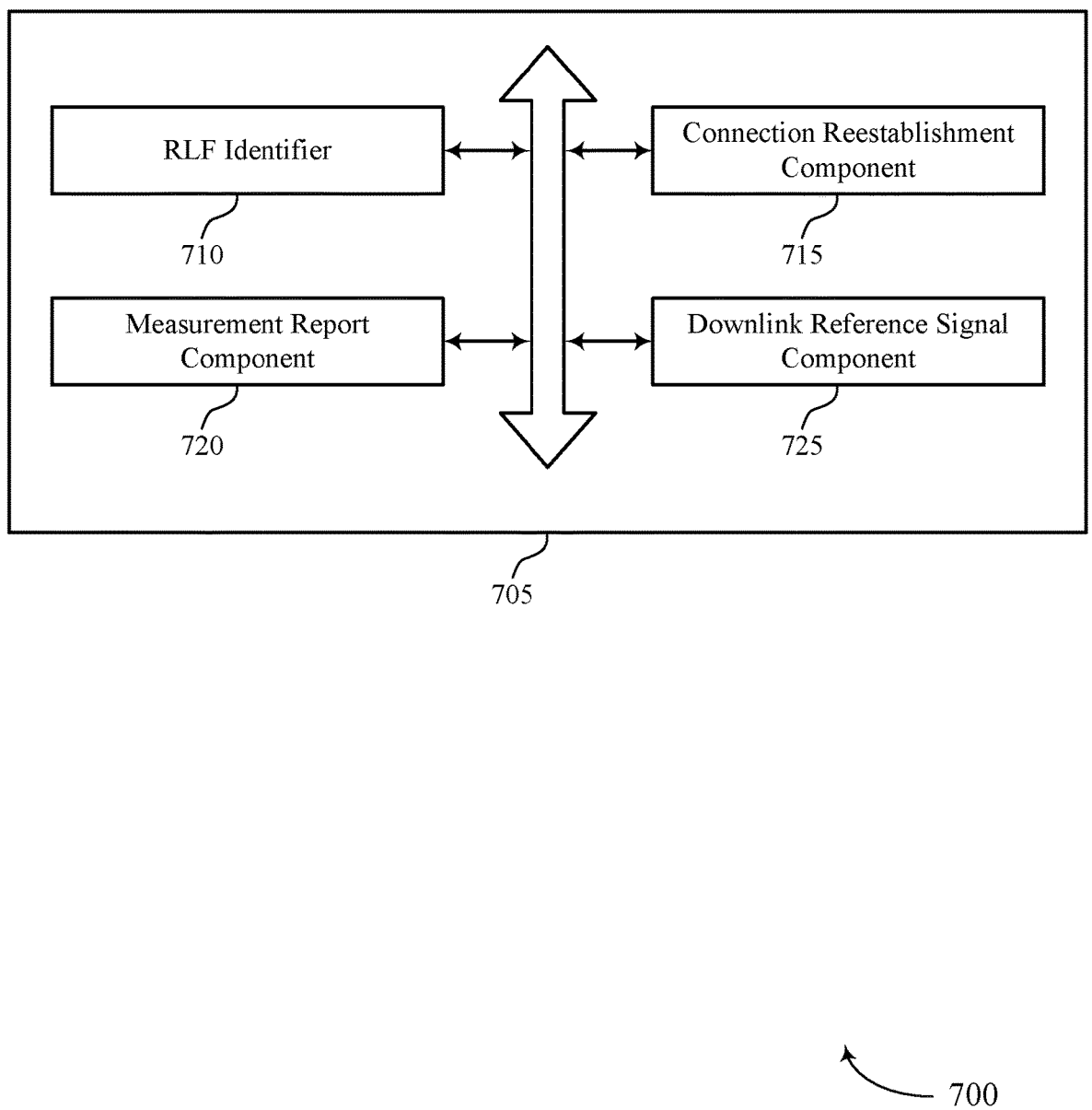
FIG. 7 shows a diagram of a device that supports RLF based measurement reporting in NB-IoT in accordance with aspects of the present disclosure.

FIG. 7 shows a diagram 700 of a UE measurement manager 705 that supports RLF based measurement reporting in NB-IoT in accordance with aspects of the present disclosure. The UE measurement manager 705 may be an example of aspects of a UE measurement manager 515, a UE measurement manager 615, or a UE measurement manager 810 described herein. The UE measurement manager 705 may include an RLF identifier 710, a connection reestablishment component 715, a measurement report component 720, and a downlink reference signal component 725. Each of these modules may communicate, directly or indirectly, with one another (e.g., via one or more buses).

The RLF identifier 710 may identify an RLF for communications with a base station in the narrowband communications system. In some cases, the RLF includes a maximum number of RACH attempts failure, a maximum number of RLC PDU retransmissions failure, or a physical layer link failure. In some cases, the UE may be a cell edge NB-IoT UE associated with the base station.

The connection reestablishment component 715 may initiate an RRC connection reestablishment procedure based on the identified RLF. Additionally, in some examples, the connection reestablishment component 715 may determine the RRC connection reestablishment procedure is successful. In some examples, the connection reestablishment component 715 may transmit, to the base station, an RRC connection reestablishment request message, where the RRC connection reestablishment request message includes a reestablishment cause based on the identified RLF. The connection reestablishment component 715 may then receive, from the base station, an RRC connection reestablishment message based on the RRC connection reestablishment request message, where the RRC connection reestablishment message indicates resources configured for the RRC connection reestablishment procedure.

The measurement report component 720 may transmit, to the base station, an RRC connection reestablishment complete message based on the successful RRC connection reestablishment procedure, the RRC connection reestablishment complete message including a measurement report related to downlink signals received from the base station. In some cases, the RRC connection reestablishment complete message may be an MSG-5 of the RRC connection reestablishment procedure. In some examples, the measurement report component 720 may transmit the measurement report in a single RRC message. In some cases, the measurement report may include at least an NRSRP and an NRSRQ measurement.

The downlink reference signal component 725 may receive, from the base station, downlink reference signals based on a cell selection or a cell reselection procedure. In some examples, the downlink reference signal component 725 may measure a signal power and a signal quality associated with the downlink reference signals. In some examples, the downlink reference signal component 725 may transmit, to the base station, the signal power and the signal quality in the measurement report in the RRC connection reestablishment complete message. In some cases, the measured signal power may include an NRSRP measurement, and the measured signal quality may include an NRSRQ measurement, where the NRSRP measurement indicates a downlink signal strength and the NRSRQ measurement indicates a downlink signal quality.

Figure 8:
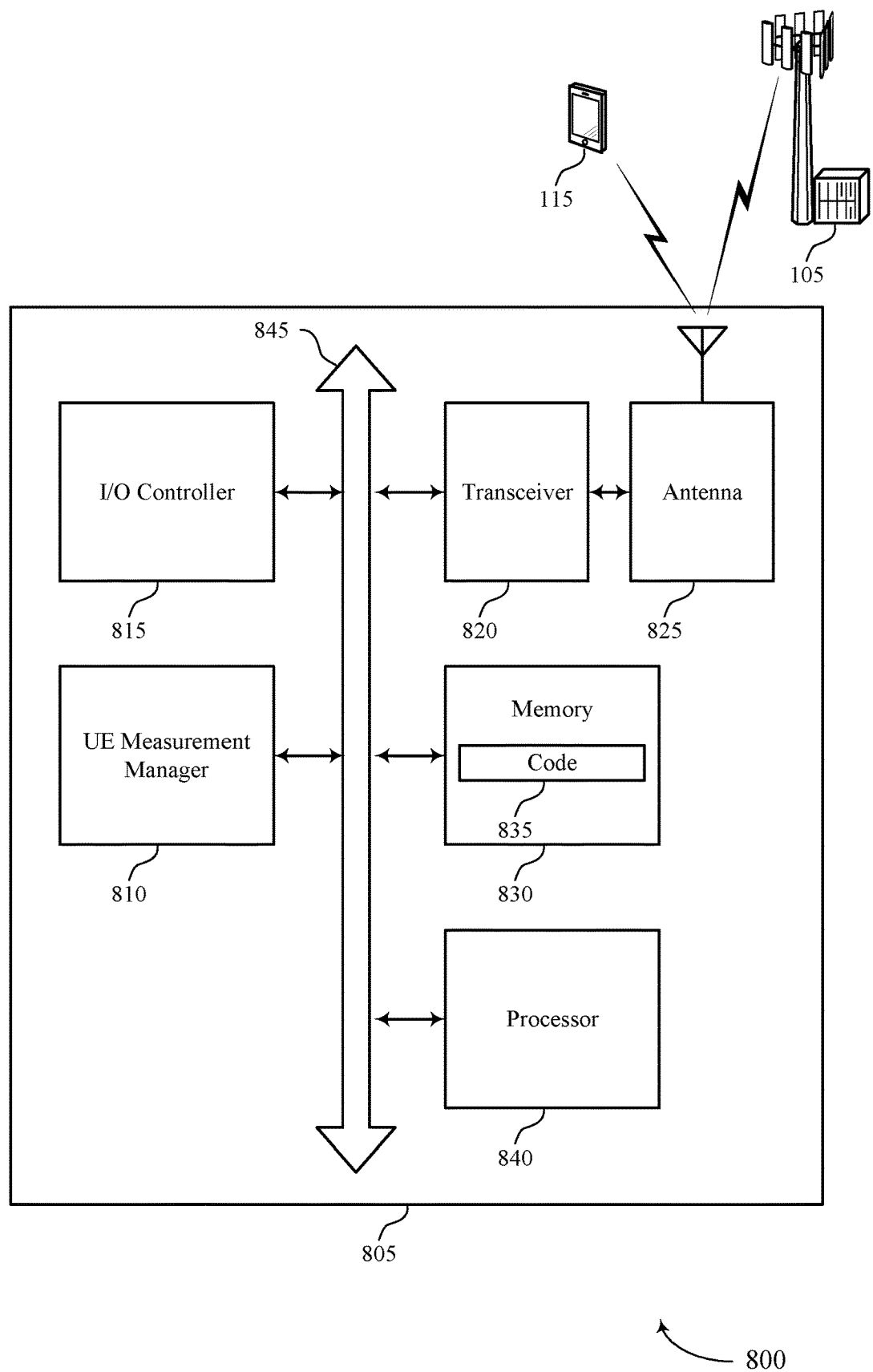
FIG. 8 shows a diagram of a system including a device that supports RLF based measurement reporting in NB-IoT in accordance with aspects of the present disclosure.

FIG. 8 shows a diagram of a system 800 including a device 805 that supports RLF based measurement reporting in NB-IoT in accordance with aspects of the present disclosure. The device 805 may be an example of or include the components of device 505, device 605, or a UE 115 as described herein. The device 805 may include components for bi-directional voice and data communications including components for transmitting and receiving communications, including a UE measurement manager 810, an I/O controller 815, a transceiver 820, an antenna 825, memory 830, and a processor 840. These components may be in electronic communication via one or more buses (e.g., bus 845).

The UE measurement manager 810 may identify an RLF for communications with a base station in the narrowband communications system. Accordingly, the UE measurement manager 810 may initiate an RRC connection reestablishment procedure based on the identified RLF. In some cases, the UE measurement manager 810 may determine the RRC connection reestablishment procedure is successful. As such, the UE measurement manager 810 may transmit, to the base station, an RRC connection reestablishment complete message based on the successful RRC connection reestablishment procedure, the RRC connection reestablishment complete message including a measurement report related to downlink signals received from the base station.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting RLF based measurement reporting in NB-IoT).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
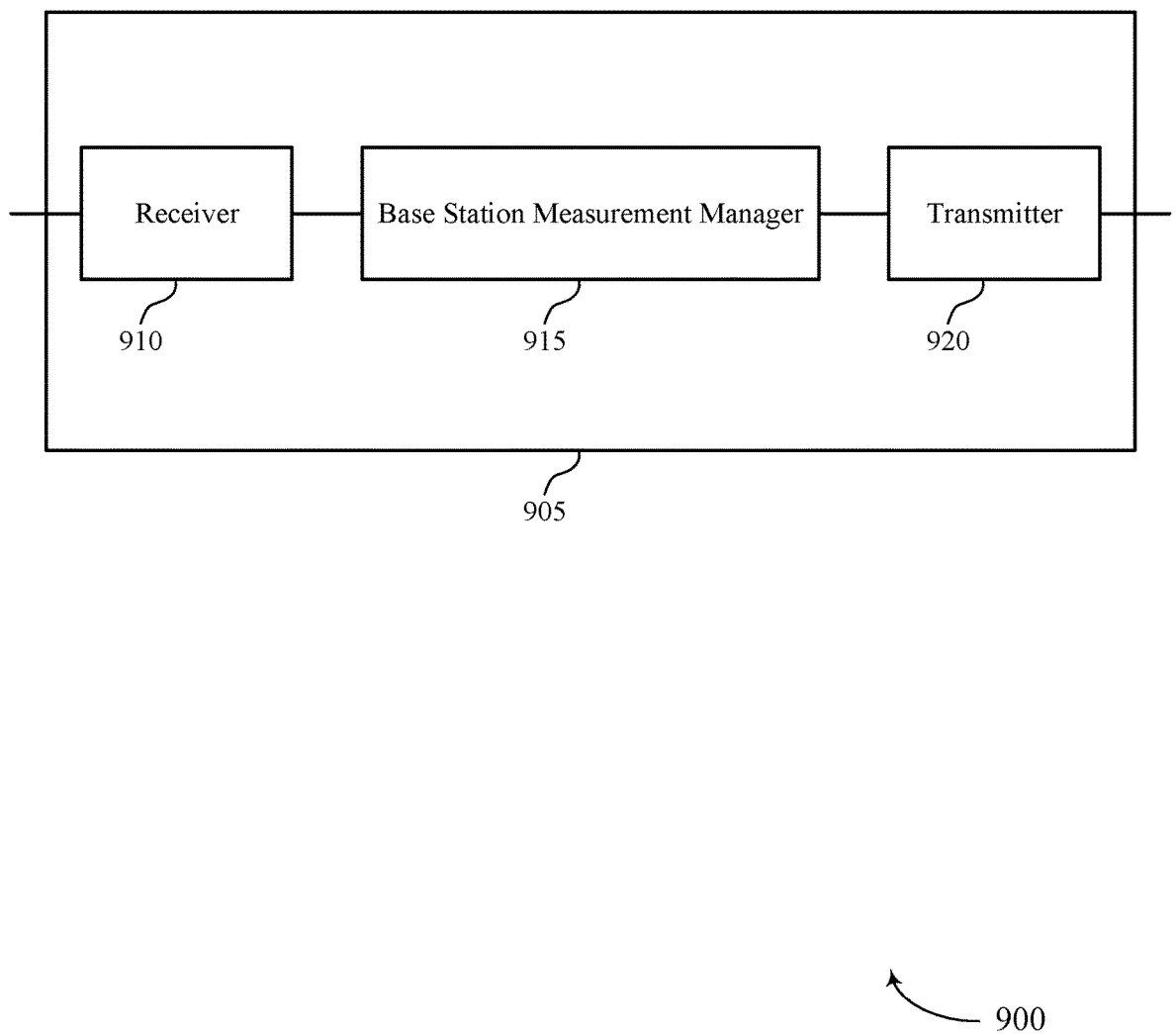
FIGS. 9 and 10 show diagrams of devices that support RLF based measurement reporting in NB-IoT in accordance with aspects of the present disclosure.

FIG. 9 shows a diagram 900 of a device 905 that supports RLF based measurement reporting in NB-IoT in accordance with aspects of the present disclosure. The device 905 may be an example of aspects of a base station 105 as described herein. The device 905 may include a receiver 910, a base station measurement manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to RLF based measurement reporting in NB-IoT, etc.). Information may be passed on to other components of the device 905. The receiver 910 may be an example of aspects of the transceiver 1220 described with reference to FIG. 12. The receiver 910 may utilize a single antenna or a set of antennas.

The base station measurement manager 915 may receive, from a UE, an RRC connection reestablishment complete message, where the RRC connection reestablishment complete message includes an indication of a successful RRC connection reestablishment for the UE. In some cases, the base station measurement manager 915 may identify a measurement report in the RRC connection reestablishment complete message. Accordingly, the base station measurement manager 915 may perform network planning based on the measurement report received in the RRC connection reestablishment complete message. The base station measurement manager 915 may be an example of aspects of the base station measurement manager 1210 described herein.

The base station measurement manager 915, or its sub-components, may be implemented in hardware, code (e.g., software or firmware) executed by a processor, or any combination thereof. If implemented in code executed by a processor, the functions of the base station measurement manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The base station measurement manager 915, or its sub-components, may be physically located at various positions, including being distributed such that portions of functions are implemented at different physical locations by one or more physical components. In some examples, the base station measurement manager 915, or its sub-components, may be a separate and distinct component in accordance with various aspects of the present disclosure. In some examples, the base station measurement manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
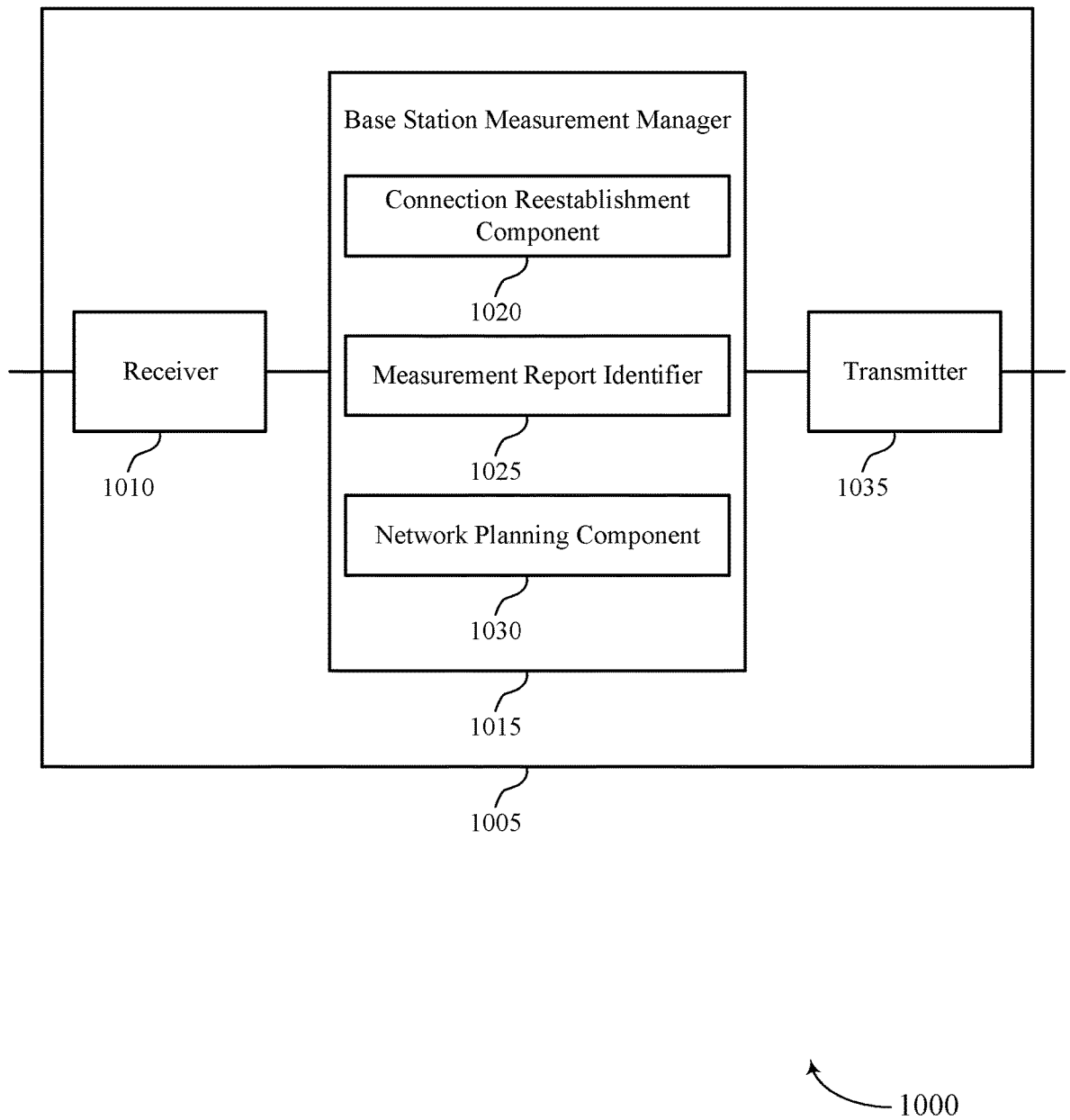

FIG. 10 shows a diagram 1000 of a device 1005 that supports RLF based measurement reporting in NB-IoT in accordance with aspects of the present disclosure. The device 1005 may be an example of aspects of a device 905 or a base station 105 as described herein. The device 1005 may include a receiver 1010, a base station measurement manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to RLF based measurement reporting in NB-IoT, etc.). Information may be passed on to other components of the device 1005. The receiver 1010 may be an example of aspects of the transceiver 1220 described with reference to FIG. 12. The receiver 1010 may utilize a single antenna or a set of antennas.

The base station measurement manager 1015 may be an example of aspects of the base station measurement manager 915 as described herein. The base station measurement manager 1015 may include a connection reestablishment component 1020, a measurement report identifier 1025, and a network planning component 1030. The base station measurement manager 1015 may be an example of aspects of the base station measurement manager 1210 described herein.

The connection reestablishment component 1020 may receive, from a UE, an RRC connection reestablishment complete message, where the RRC connection reestablishment complete message includes an indication of a successful RRC connection reestablishment for the UE.

The measurement report identifier 1025 may identify a measurement report in the RRC connection reestablishment complete message.

The network planning component 1030 may perform network planning based on the measurement report received in the RRC connection reestablishment complete message.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
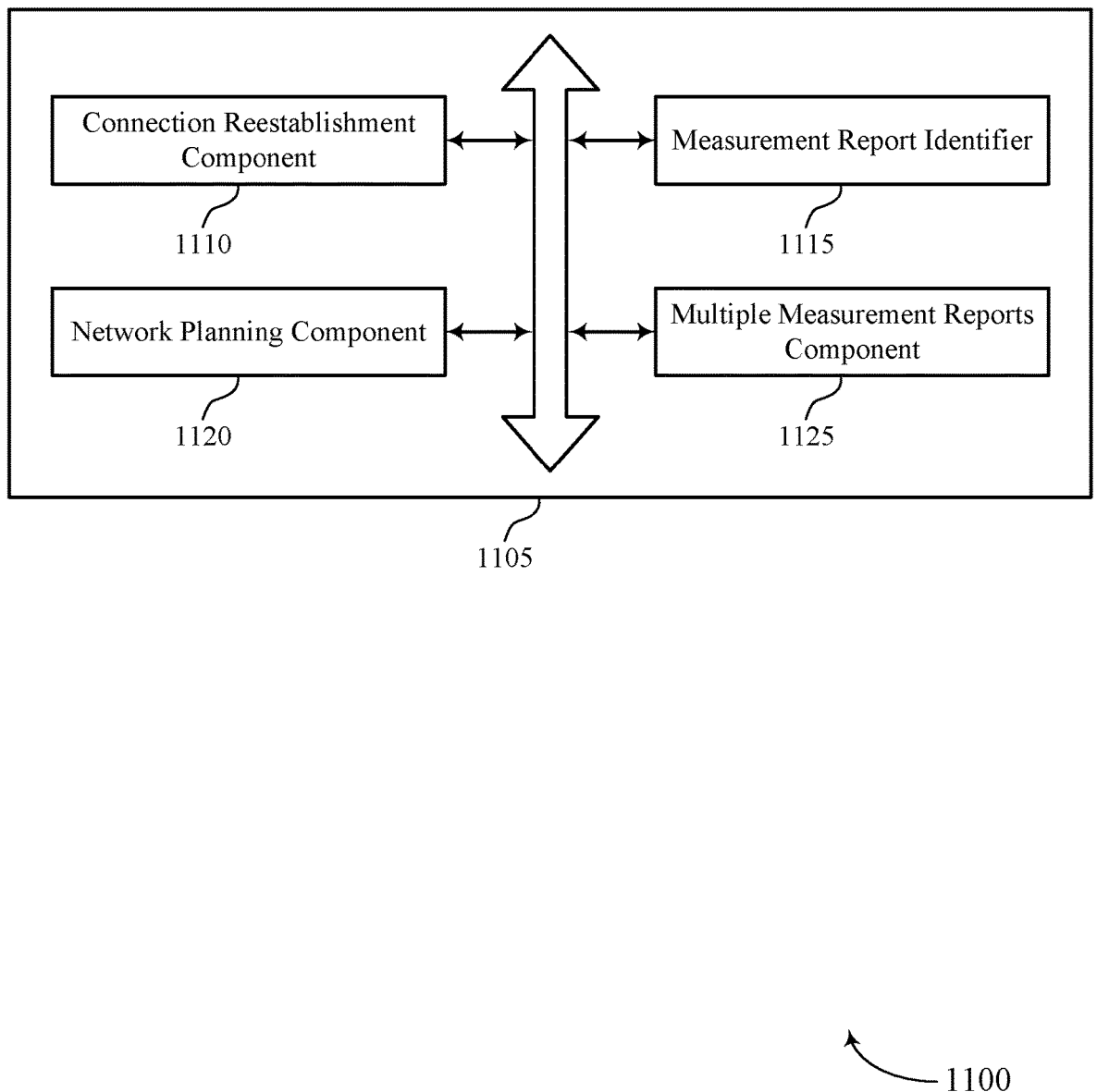
FIG. 11 shows a diagram of a device that supports RLF based measurement reporting in NB-IoT in accordance with aspects of the present disclosure.

FIG. 11 shows a diagram 1100 of a base station measurement manager 1105 that supports RLF based measurement reporting in NB-IoT in accordance with aspects of the present disclosure. The base station measurement manager 1105 may be an example of aspects of a base station measurement manager 915, a base station measurement manager 1015, or a base station measurement manager 1210 described herein. The base station measurement manager 1105 may include a connection reestablishment component 1110, a measurement report identifier 1115, a network planning component 1120, and a multiple measurement reports component 1125. Each of these modules may communicate, directly or indirectly, with one another (e.g., via one or more buses).

The connection reestablishment component 1110 may receive, from a UE, an RRC connection reestablishment complete message, where the RRC connection reestablishment complete message includes an indication of a successful RRC connection reestablishment for the UE.

The measurement report identifier 1115 may identify a measurement report in the RRC connection reestablishment complete message. In some cases, the measurement report may include at least an NRSRP and an NRSRQ measurement. Additionally, in some cases, the measurement report may be received in one RRC message.

The network planning component 1120 may perform network planning based on the measurement report received in the RRC connection reestablishment complete message. In some examples, the network planning component 1120 may increase a transmission power of a downlink signal and transmit, to the UE, the downlink signal at the increased transmission power. Additionally or alternatively, in some examples, the network planning component 1120 may adjust one or more antennas for transmission of a downlink signal and transmit, to the UE, the downlink signal according to the adjusted antennas. In some examples, the network planning component 1120 may adjust an antenna azimuth, tilt, height, or a combination thereof. Accordingly, the network planning may include network optimization.

The multiple measurement reports component 1125 may receive one or more additional RRC connection reestablishment complete messages. In some examples, the multiple measurement reports component 1125 may determine that the received additional RRC connection reestablishment complete messages exceed a threshold value of RRC connection reestablishment complete messages. Accordingly, the multiple measurement reports component 1125 may adjust one or more parameters associated with a coverage for the base station based on determining that the received one or more RRC connection reestablishment complete messages exceed the threshold value. In some cases, the one or more parameters include a downlink transmission power, a downlink repetition number, or an additional parameter associated with the coverage for the base station.

Figure 12:
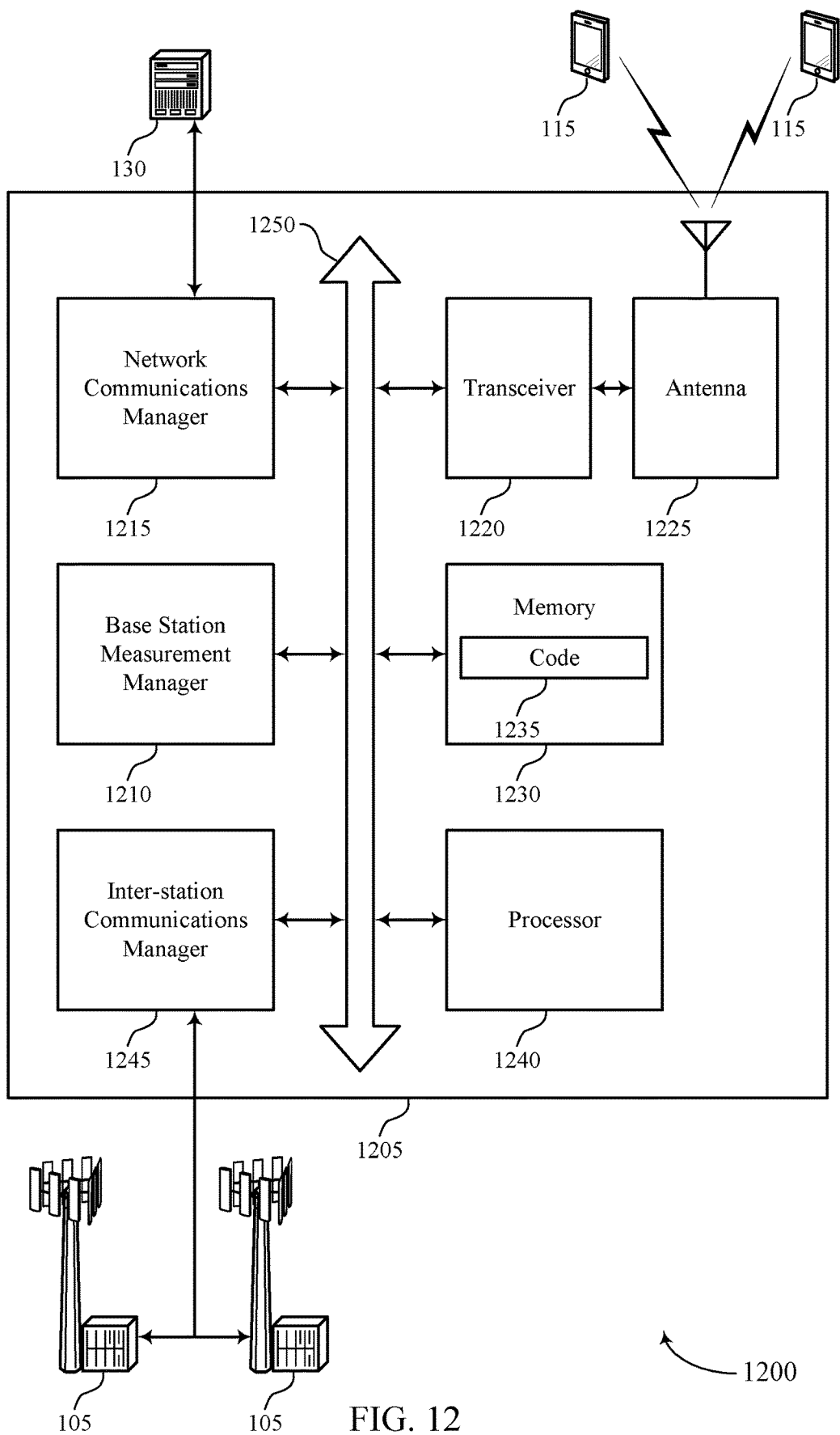
FIG. 12 shows a diagram of a system including a device that supports RLF based measurement reporting in NB-IoT in accordance with aspects of the present disclosure.

FIG. 12 shows a diagram of a system 1200 including a device 1205 that supports RLF based measurement reporting in NB-IoT in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a base station measurement manager 1210, a network communications manager 1215, a transceiver 1220, an antenna 1225, memory 1230, a processor 1240, and an inter-station communications manager 1245. These components may be in electronic communication via one or more buses (e.g., bus 1250).

The base station measurement manager 1210 may receive, from a UE, an RRC connection reestablishment complete message, where the RRC connection reestablishment complete message includes an indication of a successful RRC connection reestablishment for the UE. In some cases, the base station measurement manager 1210 may identify a measurement report in the RRC connection reestablishment complete message. Accordingly, the base station measurement manager 1210 may perform network planning based on the measurement report received in the RRC connection reestablishment complete message.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 905 to perform various functions (e.g., functions or tasks supporting RLF based measurement reporting in NB-IoT).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
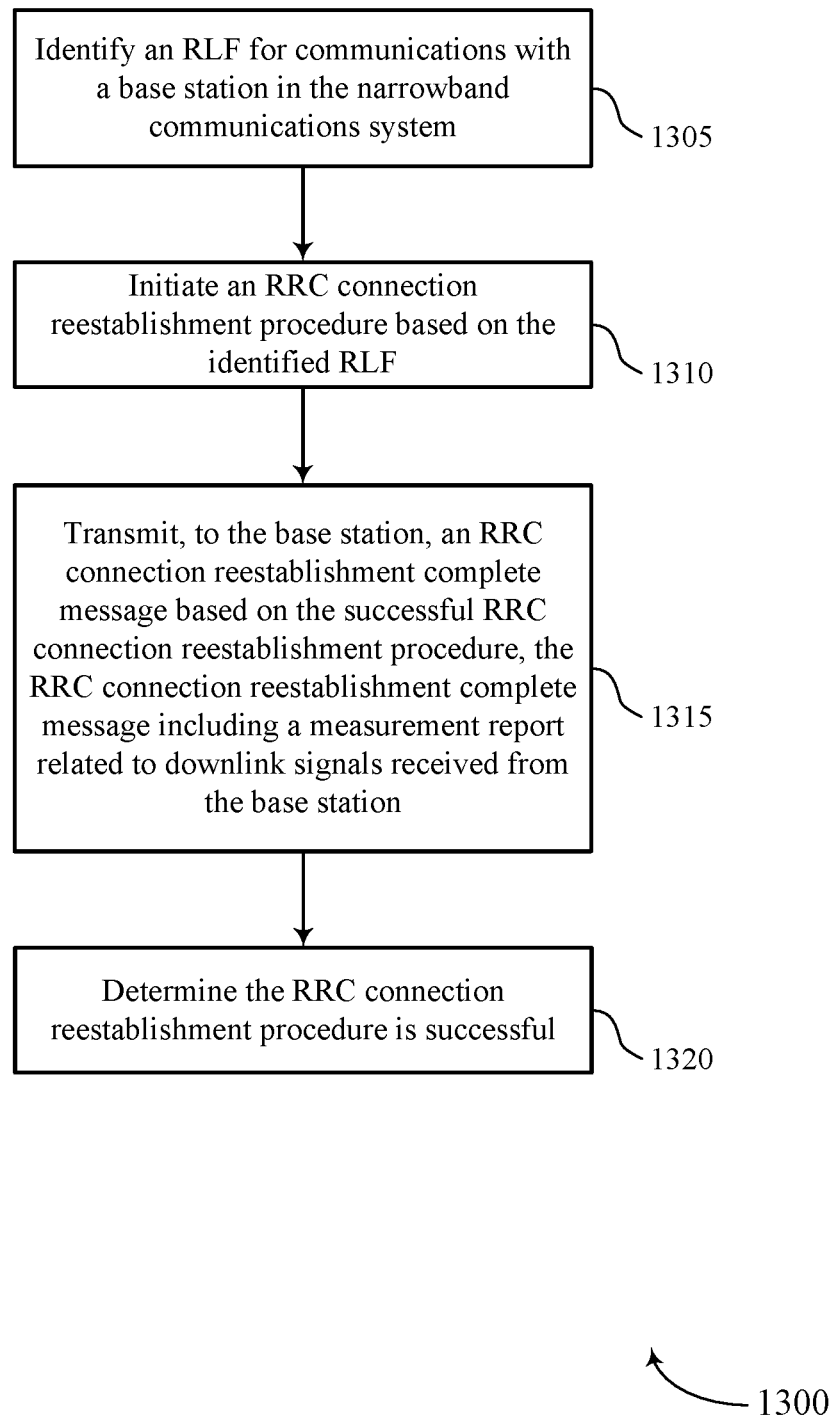
FIGS. 13 through 15 show flowcharts illustrating methods that support RLF based measurement reporting in NB-IoT in accordance with aspects of the present disclosure.

FIG. 13 shows a flowchart illustrating a method 1300 that supports RLF based measurement reporting in NB-IoT in accordance with aspects of the present disclosure. The operations of method 1300 may be implemented by a UE 115 or its components as described herein. For example, the operations of method 1300 may be performed by a UE measurement manager as described with reference to FIGS. 5 to 8. In some examples, a UE may execute a set of instructions to control the functional elements of the UE to perform the functions described below. Additionally or alternatively, a UE may perform aspects of the functions described below using special-purpose hardware.

At 1305, the UE may identify an RLF for communications with a base station in the narrowband communications system. The operations of 1305 may be performed according to the methods described herein. In some examples, aspects of the operations of 1305 may be performed by an RLF identifier as described with reference to FIGS. 5 to 8.

At 1310, the UE may initiate an RRC connection reestablishment procedure based on the identified RLF. The operations of 1310 may be performed according to the methods described herein. In some examples, aspects of the operations of 1310 may be performed by a connection reestablishment component as described with reference to FIGS. 5 to 8.

At 1315, the UE may transmit, to the base station, an RRC connection reestablishment complete message based on the successful RRC connection reestablishment procedure, the RRC connection reestablishment complete message including a measurement report related to downlink signals received from the base station. The operations of 1315 may be performed according to the methods described herein. In some examples, aspects of the operations of 1315 may be performed by a measurement report component as described with reference to FIGS. 5 to 8.

At 1320, the UE may determine the RRC connection reestablishment procedure is successful. The operations of 1320 may be performed according to the methods described herein. In some examples, aspects of the operations of 1320 may be performed by a connection reestablishment component as described with reference to FIGS. 5 to 8.

Figure 14:
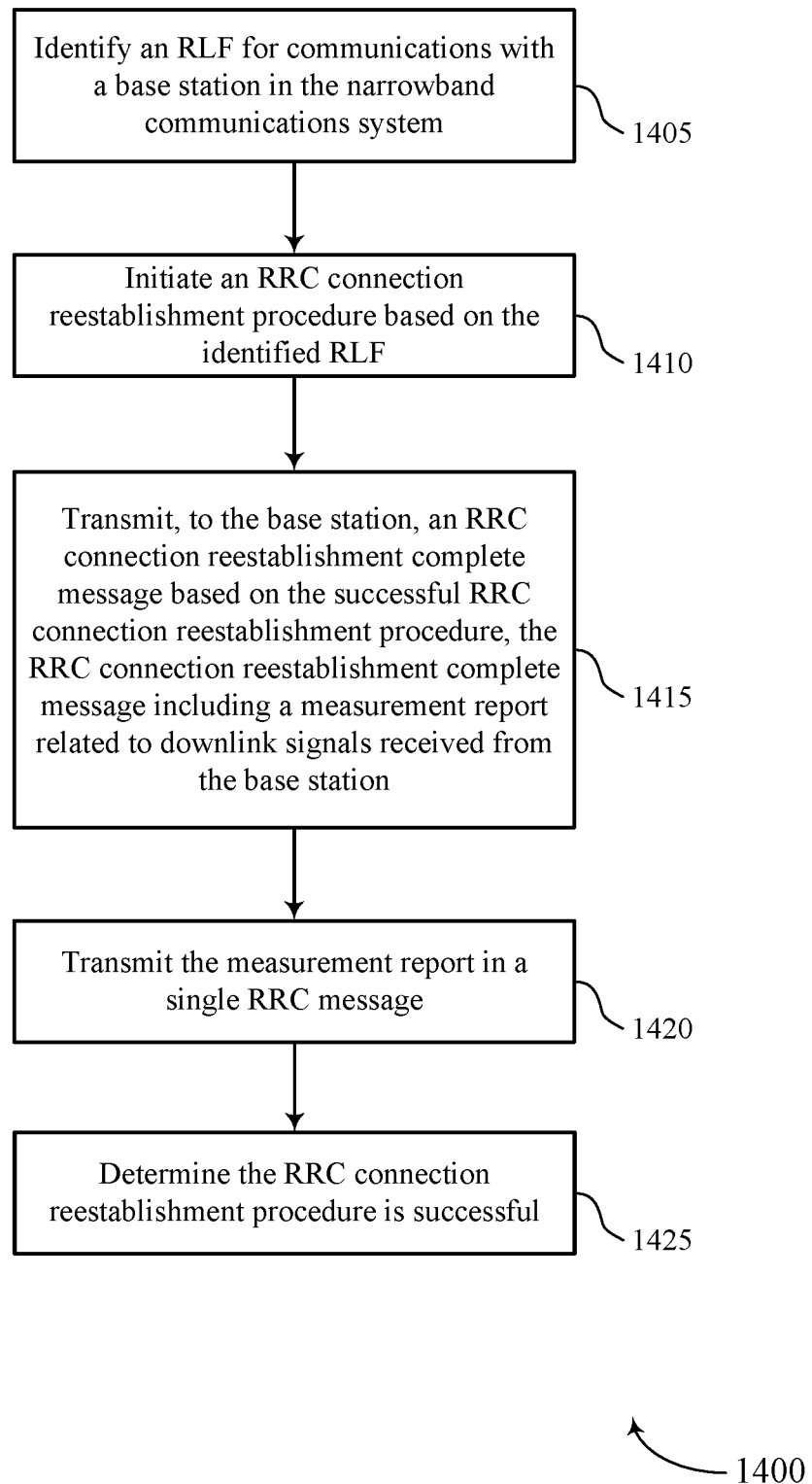

FIG. 14 shows a flowchart illustrating a method 1400 that supports RLF based measurement reporting in NB-IoT in accordance with aspects of the present disclosure. The operations of method 1400 may be implemented by a UE 115 or its components as described herein. For example, the operations of method 1400 may be performed by a UE measurement manager as described with reference to FIGS. 5 to 8. In some examples, a UE may execute a set of instructions to control the functional elements of the UE to perform the functions described below. Additionally or alternatively, a UE may perform aspects of the functions described below using special-purpose hardware.

At 1405, the UE may identify an RLF for communications with a base station in the narrowband communications system. The operations of 1405 may be performed according to the methods described herein. In some examples, aspects of the operations of 1405 may be performed by an RLF identifier as described with reference to FIGS. 5 to 8.

At 1410, the UE may initiate an RRC connection reestablishment procedure based on the identified RLF. The operations of 1410 may be performed according to the methods described herein. In some examples, aspects of the operations of 1410 may be performed by a connection reestablishment component as described with reference to FIGS. 5 to 8.

At 1415, the UE may transmit, to the base station, an RRC connection reestablishment complete message based on the successful RRC connection reestablishment procedure, the RRC connection reestablishment complete message including a measurement report related to downlink signals received from the base station. The operations of 1415 may be performed according to the methods described herein. In some examples, aspects of the operations of 1415 may be performed by a measurement report component as described with reference to FIGS. 5 to 8.

At 1420, the UE may transmit the measurement report in a single RRC message. The operations of 1420 may be performed according to the methods described herein. In some examples, aspects of the operations of 1420 may be performed by a measurement report component as described with reference to FIGS. 5 to 8.

At 1425, the UE may determine the RRC connection reestablishment procedure is successful. The operations of 1425 may be performed according to the methods described herein. In some examples, aspects of the operations of 1425 may be performed by a connection reestablishment component as described with reference to FIGS. 5 to 8.

Figure 15:
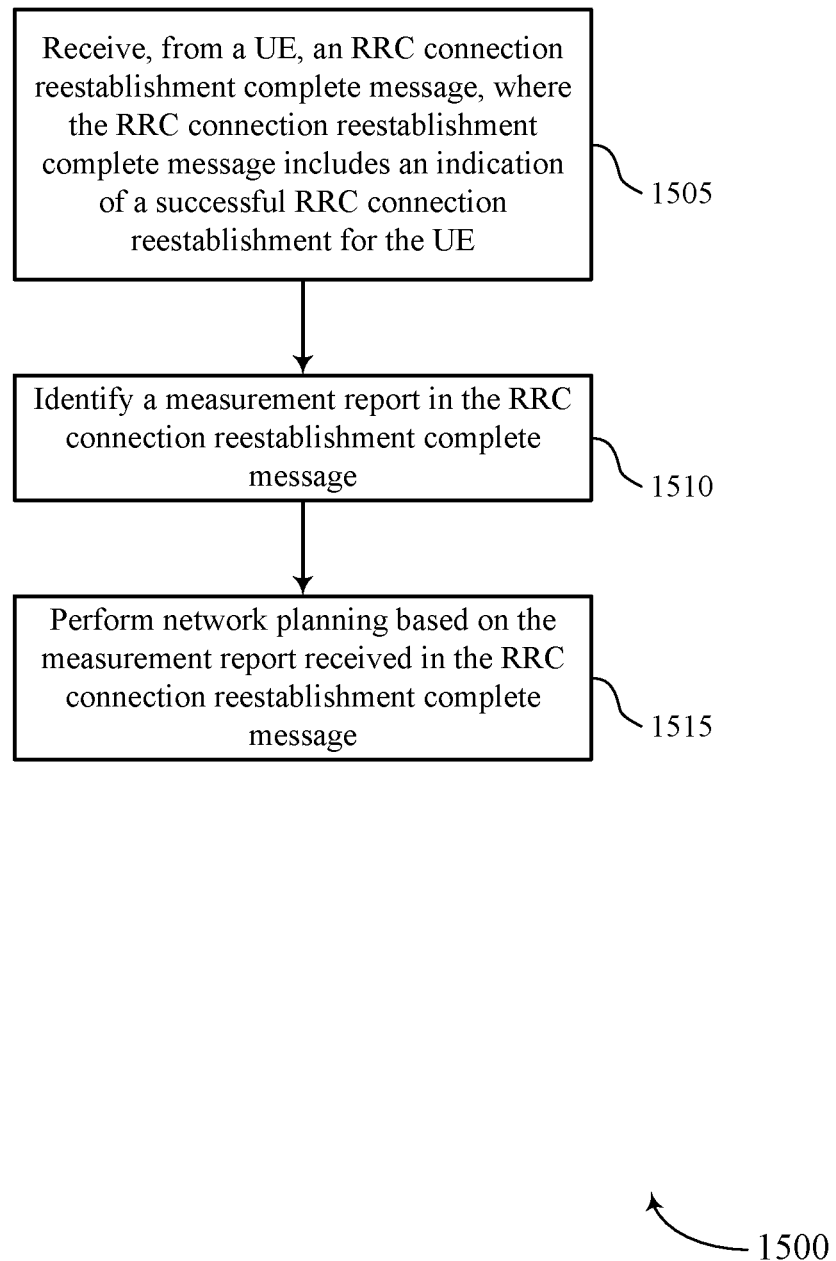

FIG. 15 shows a flowchart illustrating a method 1500 that supports RLF based measurement reporting in NB-IoT in accordance with aspects of the present disclosure. The operations of method 1500 may be implemented by a base station 105 or its components as described herein. For example, the operations of method 1500 may be performed by a base station measurement manager as described with reference to FIGS. 9 to 12. In some examples, a base station may execute a set of instructions to control the functional elements of the base station to perform the functions described below. Additionally or alternatively, a base station may perform aspects of the functions described below using special-purpose hardware.

At 1505, the base station may receive, from a UE, an RRC connection reestablishment complete message, where the RRC connection reestablishment complete message includes an indication of a successful RRC connection reestablishment for the UE. The operations of 1505 may be performed according to the methods described herein. In some examples, aspects of the operations of 1505 may be performed by a connection reestablishment component as described with reference to FIGS. 9 to 12.

At 1510, the base station may identify a measurement report in the RRC connection reestablishment complete message. The operations of 1510 may be performed according to the methods described herein. In some examples, aspects of the operations of 1510 may be performed by a measurement report identifier as described with reference to FIGS. 9 to 12.

At 1515, the base station may perform network planning based on the measurement report received in the RRC connection reestablishment complete message. The operations of 1515 may be performed according to the methods described herein. In some examples, aspects of the operations of 1515 may be performed by a network planning component as described with reference to FIGS. 9 to 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram (e.g., diagram) form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE) operating in a narrowband communications system, comprising:
   identifying a radio link failure (RLF) for communications with a base station in the narrowband communications system;
   initiating a radio resource control (RRC) connection reestablishment procedure based at least in part on the identified RLF;
   determining the RRC connection reestablishment procedure is successful; and
   transmitting, to the base station, an RRC connection reestablishment complete message based at least in part on the successful RRC connection reestablishment procedure, the RRC connection reestablishment complete message comprising a measurement report comprising a narrowband reference signal received power (NRSRP) measurement and a narrowband reference signal received quality (NRSRQ) measurement related to downlink signals received from the base station.

2. The method of claim 1, further comprising:
   receiving, from the base station, downlink reference signals based at least in part on a cell selection or a cell reselection procedure;
   measuring the NRSRP and the NRSRQ associated with the downlink reference signals.

3. The method of claim 1, wherein the NRSRP measurement indicates a downlink signal strength and the NRSRQ measurement indicates a downlink signal quality.

4. The method of claim 1, further comprising:
   transmitting the measurement report in a single RRC message.

5. The method of claim 1, wherein the RRC connection reestablishment complete message comprises a message5 of the RRC connection reestablishment procedure.

6. The method of claim 1, wherein the RLF comprises a maximum number of random access channel (RACH) attempts failure, a maximum number of radio link control (RLC) packet data unit (PDU) retransmissions failure, or a physical layer link failure.

7. The method of claim 1, wherein determining the RRC connection reestablishment procedure is successful further comprises:
   transmitting, to the base station, an RRC connection reestablishment request message, wherein the RRC connection reestablishment request message comprises a reestablishment cause based at least in part on the identified RLF; and
   receiving, from the base station, an RRC connection reestablishment message based at least in part on the RRC connection reestablishment request message, wherein the RRC connection reestablishment message indicates resources configured for the RRC connection reestablishment procedure.

8. The method of claim 1, wherein the UE comprises a cell edge narrowband Internet of Things (IoT) UE associated with the base station.

9. An apparatus for wireless communications at a user equipment (UE) operating in a narrowband communications system, comprising:
   a processor,
   memory coupled with the processor; and
   instructions stored in the memory and executable by the processor to cause the apparatus to:
      identify a radio link failure (RLF) for communications with a base station in the narrowband communications system;
      initiate a radio resource control (RRC) connection reestablishment procedure based at least in part on the identified RLF;
      determine the RRC connection reestablishment procedure is successful; and
      transmit, to the base station, an RRC connection reestablishment complete message based at least in part on the successful RRC connection reestablishment procedure, the RRC connection reestablishment complete message comprising a measurement report comprising a narrowband reference signal received power (NRSRP) measurement and a narrowband reference signal received quality (NRSRQ) measurement related to downlink signals received from the base station.

10. The apparatus of claim 9, wherein the instructions are further executable by the processor to cause the apparatus to:
    receive, from the base station, downlink reference signals based at least in part on a cell selection or a cell reselection procedure;

measure the NRSRP and the NRSRQ associated with the downlink reference signals.

11. The apparatus of claim 9, wherein the instructions are further executable by the processor to cause the apparatus to:
   transmit the measurement report in a single RRC message.

12. The apparatus of claim 9, wherein the RLF comprises a maximum number of random access channel (RACH) attempts failure, a maximum number of radio link control (RLC) packet data unit (PDU) retransmissions failure, or a physical layer link failure.

13. The apparatus of claim 9, wherein the instructions to determine the RRC connection reestablishment procedure is successful further are executable by the processor to cause the apparatus to:
   transmit, to the base station, an RRC connection reestablishment request message, wherein the RRC connection reestablishment request message comprises a reestablishment cause based at least in part on the identified RLF; and
   receive, from the base station, an RRC connection reestablishment message based at least in part on the RRC connection reestablishment request message, wherein the RRC connection reestablishment message indicates resources configured for the RRC connection reestablishment procedure.

* * * * *